US012774809B2

(12) United States Patent
Hughes et al.

(10) Patent No.: US 12,774,809 B2
(45) Date of Patent: Oct. 27, 2026

(54) ARRANGEMENTS FOR CHEMICAL LOOPING COMBUSTION SYSTEMS

(71) Applicant: HER MAJESTY THE QUEEN IN RIGHT OF CANADA AS REPRESENTED BY THE MINISTER OF NATURAL RESOURCES, Ottawa (CA)

(72) Inventors: Robin Hughes, Ottawa (CA); Robert Symonds, Ottawa (CA); Scott Champagne, Ottawa (CA); Emi Luka, Ottawa (CA); Nicole Bond, Ottawa (CA)

(73) Assignee: HER MAJESTY THE QUEEN IN RIGHT OF CANADA AS REPRESENTED BY THE MINISTER OF NATURAL SOURCES, Ottawa (CA)

( * ) Notice: Subject to any disclaimer, the term of this patent is extended or adjusted under 35 U.S.C. 154(b) by 357 days.

(21) Appl. No.: 18/702,600

(22) PCT Filed: Oct. 18, 2022

(86) PCT No.: PCT/CA2022/051535

§ 371 (c)(1),
(2) Date: Apr. 18, 2024

(87) PCT Pub. No.: WO2023/065024

PCT Pub. Date: Apr. 27, 2023

(65) Prior Publication Data

US 2025/0290627 A1 Sep. 18, 2025

Related U.S. Application Data

(60) Provisional application No. 63/257,404, filed on Oct. 19, 2021.

(51) Int. Cl.
*F23C 10/00* (2006.01)
*B01D 47/00* (2006.01)
(Continued)

(52) U.S. Cl.
CPC ............ *F23C 10/005* (2013.01); *B01D 47/00* (2013.01); *B01D 51/10* (2013.01); *B01D 53/265* (2013.01);
(Continued)

(58) Field of Classification Search
CPC .......... F23C 10/005; F23C 9/00; F23C 99/00; F23C 2900/99008; B01D 47/00;
(Continued)

(56) References Cited

U.S. PATENT DOCUMENTS 6,025,403 A 2/2000 Marler et al.
2014/0158030 A1* 6/2014 Jadhav .................... F23L 7/007 110/345
(Continued)

FOREIGN PATENT DOCUMENTS

CN 104203374 A 12/2014
CN 106438043 A 2/2017
(Continued)

OTHER PUBLICATIONS

PCT International Search Report and Written Opinion for International Application No. PCT/CA2022/051535, dated Jan. 18, 2023, 8 pages.
(Continued)

*Primary Examiner* — Avinash A Savani
(74) *Attorney, Agent, or Firm* — Hoffman Warnick LLC

(57) ABSTRACT

The invention discloses partial conversion of a hydrocarbon fuel to CO and $H_2$ within a heat exchanger reformer, prior to injection of the fuel into fuel reactor of a chemical looping combustion system, including reforming portion of the fuel
(Continued)

used for the chemical looping combustion system in the heat exchange reformer through reaction with steam and/or other suitable gas, or reforming portion of the fuel used for the chemical looping combustion system in the heat exchange reformer through reaction with recycled flue gas. The invention further discloses the use of recycled flue gas, without the use of a heat exchange reformer prior to injection of the fuel into the fuel reactor of a chemical looping combustion system.

12 Claims, 20 Drawing Sheets

(51) Int. Cl.

| | |
|---|---|
| ***B01D 51/10*** | (2006.01) |
| ***B01D 53/26*** | (2006.01) |
| ***B01J 8/02*** | (2006.01) |
| ***B01J 8/18*** | (2006.01) |
| ***B01J 8/26*** | (2006.01) |
| ***C01B 3/34*** | (2006.01) |
| ***F23C 9/00*** | (2006.01) |
| ***F23C 99/00*** | (2006.01) |
| ***F23J 15/06*** | (2006.01) |
| ***F23L 7/00*** | (2006.01) |

(52) U.S. Cl.

CPC ........... *B01J 8/0242* (2013.01); *B01J 8/0278* (2013.01); *B01J 8/0285* (2013.01); *B01J 8/1827* (2013.01); *B01J 8/1836* (2013.01); *B01J 8/26* (2013.01); *C01B 3/34* (2013.01); *F23C 9/00* (2013.01); *F23C 99/00* (2013.01); *F23J 15/06* (2013.01); *F23L 7/005* (2013.01); *B01D 2256/22* (2013.01); *B01D 2257/80* (2013.01); *B01D 2258/0283* (2013.01); *B01J 2208/00168* (2013.01); *C01B 2203/0233* (2013.01); *C01B 2203/0238* (2013.01); *C01B 2203/0833* (2013.01); *C01B 2203/148* (2013.01); *F23C 2900/99008* (2013.01)

(58) Field of Classification Search

CPC .. B01D 51/10; B01D 53/265; B01D 2256/22; B01D 2257/80; B01D 2258/0283; B01J 8/0242; B01J 8/0278; B01J 8/0285; B01J 8/1827; B01J 8/1836; B01J 8/26; B01J 2208/00168; C01B 3/34; C01B 2203/0233; C01B 2203/0238; C01B 2203/0833; C01B 2203/148; F23J 15/06; F23L 7/005

USPC .............................................................. 431/7

See application file for complete search history.

(56) References Cited

U.S. PATENT DOCUMENTS

| | | | | |
|---|---|---|---|---|
| 2019/0152778 | A1 | 5/2019 | Fan et al. | |
| 2022/0241745 | A1 * | 8/2022 | Housley ..................... | B01J 8/24 |

FOREIGN PATENT DOCUMENTS

| | | | |
|---|---|---|---|
| CN | 108729965 | A | 11/2018 |
| JP | 2016069547 | A | 5/2016 |
| WO | 2010099555 | A1 | 9/2010 |

OTHER PUBLICATIONS

Supplementary and Extended European Search Report for Application No. EP22882137, dated Dec. 22, 2025, 7 pages.

Ryden M et al., "Using steam reforming to produce hydrogen with carbon dioxide capture by chemical-looping combustion", International Journal of Hydrogen Energy, Elsevier Ltd, Amsterdam, NL, vol. 31, No. 10, Aug. 1, 2006 (Aug. 1, 2006), pp. 1271-1283.

* cited by examiner

ARRANGEMENTS FOR CHEMICAL LOOPING COMBUSTION SYSTEMS

FIELD OF THE INVENTION

The present invention relates to a chemical looping combustion system. More specifically, the invention relates to the partial conversion of a hydrocarbon fuel to CO and $H_2$ within a heat exchanger reformer, prior to injection of the fuel into a fuel reactor of a chemical looping combustion system, including reforming at least a portion of the fuel used for the chemical looping combustion system in the heat exchange reformer through reaction with steam and/or other suitable gas, or reforming at least a portion of the fuel used for the chemical looping combustion system in the heat exchange reformer through reaction with recycled flue gas. The present invention further relates to the use of recycled flue gas, without the use of a heat exchange reformer prior to injection of the fuel into the fuel reactor of a chemical looping combustion system.

BACKGROUND OF THE INVENTION

Chemical looping combustion is a process typically employing a dual fluidized bed system. In chemical looping combustion, a metal oxide is employed as a bed material providing the oxygen for combustion in the fuel reactor. The reduced metal is then transferred to the second bed (air reactor) and re-oxidized before being reintroduced back to the fuel reactor completing the loop.

Chemical looping has been used for cycling processes that use a solid material as oxygen-carrier containing the oxygen required for the conversion of the fuel. To close the loop, the oxygen depleted solid material must be re-oxidized before starting a new cycle. The final purpose of the conversion of the fuel can be the combustion or the hydrogen production.

In chemical looping combustion systems, oxygen is introduced to the system through reduction-oxidation cycling of an oxygen carrier. The oxygen carrier is usually a solid, metal-based compound. The oxygen carrier may be in the form of a single metal oxide, such as an oxide of copper, nickel, or iron, or several metal oxides supported on a high-surface-area substrate (e.g., alumina or silica), which does not take part in the reactions. For a typical chemical looping combustion process, combustion is split into separate reduction and oxidation reactions in multiple reactors. The metal oxide supplies oxygen for combustion and is reduced by the fuel in the fuel reactor, which is operated at elevated temperature.

In its most basic form, chemical looping consists of an air reactor and a fuel reactor. Usually, these reactors consist of interconnected fluidized beds. An oxygen carrier is circulated between the two reactors. This oxygen carrier usually consists of a metal that is easily oxidized, such as Fe, Ni, or Cu.

In order to describe the chemical looping process, the oxygen carrier in its non-oxidized form is denoted as Me, and the oxidized form of the carrier is denoted as MeO. Starting in the air (or oxidizing) reactor where Me is entrained in a fluidized bed with air as the fluidizing agent. At an elevated temperature, Me reacts with the oxygen in the air in an exothermic reaction producing MeO according to the reaction:

$$2Me+O_2 \rightarrow 2MeO$$

MeO is then separated from the $N_2$ and transported to the fuel (or reducer) reactor. MeO reacts with a hydrocarbon fuel in the fuel reactor to produce $CO_2$ and $H_2O$ while reducing MeO to Me according to the reactions:

$$2MeO+C \rightarrow 2Me+CO_2$$

$$MeO+H_2 \rightarrow Me+H_2O$$

Me is then transported back to the air reactor to repeat the process.

FIG. 1 provides an example of a configuration of a known chemical looping combustion system.

In FIG. 1, ambient air is compressed, pre-heated in a heat exchanger HX1 and then sent to an air reactor 10. In the air reactor 10, oxygen in the air reacts with a reduced metal oxide, producing an oxidized metal oxide and a vitiated air stream, composed primarily of nitrogen. Heat is removed from the air reactor 10 via an in-bed heat exchanger HX2 and a convective heat exchanger HX3. The vitiated air stream is cooled in heat exchanger HX1 and filtered through a vitiated air filter 15 before being expanded in a vitiated air expander 20 to produce power to run an air compressor 30. The vitiated air is then vented to atmosphere. Gaseous fuel (fuel gas) is pre-heated in a heat exchanger HX5 and enters a fuel reactor 40 which comprises a heat exchanger HX6 where the fuel gas reacts with the oxidized metal oxide to produce gaseous combustion products ($H_2O$, $CO_2$) and reduced metal oxide. The combustion products are subsequently cooled in a series of heat exchangers, for example, HX7, HX5 and HX8. Water is then removed in a condensing heat exchanger HX9 before the combustion gas is scrubbed and cooled further in a direct contact cooler 50 which comprises a heat exchanger HX10 to produce a purified $CO_2$ product. The $CO_2$ product is then further dried by a heat exchanger HX11 and compressed by a $CO_2$ compressor 70.

One problem associated with chemical looping combustion is the low reactivity of some oxygen carriers with the fuel which comprises alkanes, especially with methane, which results in low conversion of the alkane to $CO_2$ and $H_2O$.

This issue of low reactivity has been addressed through the following means:

a. The quantity of oxygen carrier is increased in order to increase the gas residence time of the alkane as it passes through the oxygen carrier within the fuel reactor.

b. Higher reactivity oxygen carriers are used. For example, oxygen carriers containing elements such as Ni and Cu in place of Fe.

However, there are still certain limitations and drawbacks related to these existing solutions to the issues of low reactivity:

a. When increasing the quantity of oxygen carrier, and hence the depth of oxygen carrier within the fuel reactor, to address the issue of low reactivity there are the following drawbacks and limitations:

i. The pressure drop across the fuel reactor increases. This results in the requirement for additional compression of the reactants and/or products resulting in higher capital costs and increased electricity demand.

ii. When using fluidized beds for the fuel reactor, bubbles coalesce and consequently increase in size as they pass upwards through the fuel reactor until they reach maxima in size. The gas interchange between the bubbles and the oxygen carriers is relatively poor when bubbles are large, so increasing bed depth becomes increasingly ineffective at increasing fuel conversion as the bed depth increases. For relatively low reactivity oxygen carriers, it will not be possible to meet fuel conversion targets through this means alone.

iii. As the bed depth increases, it becomes increasingly difficult to ensure that the bed material is well mixed, consequently, some fraction of the oxygen carrier will remain in the reactor for a long time after it has transferred its oxygen to the fuel. The oxygen carrier is then effectively inert, resulting in the increased bed depth being ineffective at increasing fuel conversion.

iv. As the quantity of bed material increases in the fuel reactor, the structural elements required to support the fuel reactor gas distributor must support a greater dynamic load due to both the mass of oxygen carrier and the effect of larger gas bubbles. The increased load requirement increases the capital cost of the fuel reactor, and also poses a limitation to the throughput of the fuel reactor as the load approaches the limits of constructability.

v. As the bed depth increases, the differential pressure across the fuel reactor increases, resulting in volumetric gas expansion due to change in the gas pressure. This volumetric gas expansion is additive with the volumetric gas expansion resulting from conversion of the fuel.

b. When using higher reactivity oxygen carriers, there are also a number of drawbacks and limitations that may be encountered:

i. Many high reactivity oxygen carriers contain elements that may pose hazards to human health and the environment if they are released from the chemical looping system. For example, NiO has been demonstrated to be a highly reactive oxygen carrier but has been demonstrated to have potential negative health impacts when inhaled as fine particulate matter. Given that attrition, i.e., particle breakage, proceeds in fluidized beds, there is a relatively high risk of these elements being released to the atmosphere if they are contained within the oxygen carrier.

ii. Higher reactivity oxygen carriers have relatively high costs. Given that attrition, i.e., particle breakage, occurs in fluidized beds, there must be a continuous or semi-continuous make-up of oxygen carrier to maintain the required inventory. This can result in high operating costs even when particle attrition is relatively low.

Another problem associated with chemical looping combustion is that during the combustion of alkanes, there is an increase in the volumetric gas flow rate due to reaction stoichiometry:

$$C_nH_{2n+2} \rightarrow nCO_2 + (n+1)H_2O$$

where n is the carbon number of the alkane.

For hydrocarbons with lower carbon numbers, this results in a relatively large change in volumetric flow rate. For example, in the case of methane combustion, with n=1, the volumetric flow rate increases by three times. This results in poor fuel conversion in chemical looping combustion systems for which the volumetric flow rate should be maintained near constant such as in bubbling fluidized beds.

The issue of gas expansion has been addressed through the following means:

a. The cross-sectional area of the fuel reactor is increased with elevation in order to achieve a nearly constant volumetric flow rate.

However, there are also limitations and drawbacks related to the existing solutions to gas expansion.

Increasing cross-sectional area of the fuel reactor with height can improve the hydrodynamics within the fuel reactor in such a way that fuel conversion can be expected to improve, however, it is quite difficult to evenly distribute the flow of fuel within the fuel reactor in order to achieve the desired plug flow of the fuel that would maximize conversion of the fuel. Regions are typically present where fuel 'plumes' or gas bypassing of the reactor occur. Furthermore, there tend to be regions in which the oxygen carrier is not well mixed with the gas and in fact defluidization may occur when insufficient gas interpenetrates the oxygen carrier. Defluidization can result in agglomeration of the oxygen carrier, i.e., large clumps of oxygen carrier particles may form. The agglomerates can lead to fuel reactor damage, very low conversion, and in extreme cases force the shutdown of the fuel reactor.

Therefore, there remains the need for improving the low reactivity of the oxygen carriers with alkanes and reducing the relative increase or relative change in volumetric flow rate in fuel reactors associated with existing chemical looping systems.

SUMMARY OF THE INVENTION

According to the present invention, a heat exchange reformer is used to partially oxidize fuels to a chemical looping combustion system to increase the extent of fuel conversion or to reduce the relative increase or relative change in volumetric flow rate in fuel reactors in chemical looping systems.

According to the present invention, for gaseous fuels, recycling of the flue gas of a chemical looping combustion system is used to decrease the relative change in volumetric flow rate in the fuel reactor.

According to a first aspect of the invention, there is provided a process for a chemical looping combustion, comprising:

compressing ambient air in an air compressor to produce a compressed air;

feeding the compressed air into an air reactor;

reacting the compressed air with a reduced metal oxide contained within the air reactor to produce an oxidized metal oxide;

moving the oxidized metal oxide from the air reactor to a fuel reactor in communication with the air reactor;

mixing a fuel gas with steam to produce a mixture of fuel gas and steam;

feeding the mixture of fuel gas and steam to a heat exchanger reformer to produce a reformed gas;

feeding the reformed gas to the fuel reactor to react with the oxidized metal oxide in the fuel reactor to produce a gaseous combustion product and the reduced metal oxide; and moving the reduced metal oxide from the fuel reactor to the air reactor.

According to one embodiment of the invention, the gaseous combustion product exiting the fuel reactor is cooled in a first heat exchanger or in the heat exchanger reformer.

According to one embodiment of the invention, the process further comprises pre-heating the compressed air in a second heat exchanger and feeding the preheated compressed air into an air reactor connected to the second heat exchanger.

According to one embodiment of the invention, the process further comprises preheating a fuel gas in a third heat exchanger to produce a preheated fuel gas.

According to the invention, the process further comprises the heat exchange reformer sources heat from: the fuel reactor, the gaseous combustion product from the fuel reactor, or the air reactor.

According to a second aspect of the invention, there is provided a process for a chemical looping combustion, comprising:

- compressing ambient air in an air compressor to produce a compressed air;
- feeding the compressed air into an air reactor;
- reacting the compressed air with a reduced metal oxide contained within the air reactor to produce an oxidized metal oxide;
- moving the oxidized metal oxide from the air reactor to a fuel reactor in communication with the air reactor;
- mixing a fuel gas with a recycled flue gas to produce a mixture of the fuel gas with the recycled flue gas;
- feeding the mixture of the fuel gas with the recycled flue gas to a heat exchanger reformer to produce a reformed gas;
- feeding the reformed gas to the fuel reactor to react with the oxidized metal oxide in the fuel reactor to produce a gaseous combustion product and the reduced metal oxide;
- moving the reduced metal oxide from the fuel reactor to the air reactor;
- feeding a portion of the gaseous combustion product to a recycle compressor to produce the recycled flue gas; and
- feeding a remaining portion of the gaseous combustion product to a condensing heat exchanger for water removal before scrubbing and cooling the remaining gas in a direct contact cooler.

According to one embodiment of the invention, the gaseous combustion product exiting the fuel reactor is cooled in a first heat exchanger or in the heat exchanger reformer before being fed to a recycle compressor.

According to one embodiment of the invention, the process further comprises pre-heating the compressed air in a second heat exchanger and feeding the preheated compressed air into an air reactor connected to the second heat exchanger.

According to one embodiment of the invention, the process further comprises preheating a fuel gas in a third heat exchanger to produce a preheated fuel gas.

According to the invention, the heat exchange reformer sources heat from: the fuel reactor, the gaseous combustion product from the fuel reactor, or the air reactor.

According to a third aspect of the invention, there is provided a process for a chemical looping combustion, comprising:

- compressing ambient air in an air compressor to produce a compressed air;
- feeding the compressed air into an air reactor;
- reacting the compressed air with a reduced metal oxide contained within the air reactor to produce an oxidized metal oxide;
- moving the oxidized metal oxide from the air reactor to a fuel reactor in communication with the air reactor;
- mixing a fuel gas with a recycled flue gas to produce a mixture of the fuel gas with the recycled flue gas;
- feeding the mixture of the fuel gas with the recycled flue gas to a heat exchanger reformer to produce a reformed gas;
- feeding the reformed gas to the fuel reactor to react with the oxidized metal oxide in the fuel reactor to produce a gaseous combustion product and the reduced metal oxide;
- moving the reduced metal oxide from the fuel reactor to the air reactor;
- feeding the gaseous combustion product to a condensing heat exchanger for water removal to produce a partially condensed gaseous combustion product;
- feeding a portion of the partially condensed gaseous combustion product to a recycle compressor to produce the recycled flue gas; and
- feeding a remaining portion of the partially condensed gaseous combustion product for scrubbing and cooling in a direct contact cooler.

According to one embodiment of the invention, the gaseous combustion product exiting the fuel reactor is cooled in a first heat exchanger or in the heat exchanger reformer before being fed to the condensing heat exchanger.

According to one embodiment of the invention, the process further comprises pre-heating the compressed air in a second heat exchanger and feeding the preheated compressed air into an air reactor connected to the second heat exchanger.

According to one embodiment of the invention, the process further comprises preheating a fuel gas in a third heat exchanger to produce a preheated fuel gas.

According to the invention, the process further comprises the heat exchange reformer sources heat from: the fuel reactor, the gaseous combustion product from the fuel reactor, or the air reactor.

According to a fourth aspect of the invention, there is provided a process for a chemical looping combustion, comprising:

- compressing ambient air in an air compressor to produce a compressed air;
- feeding the compressed air into an air reactor;
- reacting the compressed air with a reduced metal oxide contained within the air reactor to produce an oxidized metal oxide;
- moving the oxidized metal oxide from the air reactor to a fuel reactor in communication with the air reactor;
- mixing a fuel gas with a recycled flue gas to produce a mixture of the fuel gas with the recycled flue gas;
- feeding the mixture of the fuel gas with the recycled flue gas to a heat exchanger reformer to produce a reformed gas;
- feeding the reformed gas to the fuel reactor to react with the oxidized metal oxide in the fuel reactor to produce a gaseous combustion product and the reduced metal oxide;
- moving the reduced metal oxide from the fuel reactor to the air reactor;
- feeding the gaseous combustion product to a condensing heat exchanger for water removal to produce a partially condensed gaseous combustion product;
- feeding the partially condensed gaseous combustion product for scrubbing and cooling in a direct contact cooler to produce a purified $CO_2$ product; and
- feeding a portion of the $CO_2$ to the recycle compressor to produce the recycled flue gas.

According to one embodiment of the invention, the gaseous combustion product exiting the fuel reactor is cooled in a first heat exchanger or in the heat exchanger reformer before being fed to the condensing heat exchanger.

According to one embodiment of the invention, the process further comprises pre-heating the compressed air in a second heat exchanger and feeding the preheated compressed air into an air reactor connected to the second heat exchanger.

According to one embodiment of the invention, the process further comprises preheating a fuel gas in a third heat exchanger to produce a preheated fuel gas.

According to the invention, the heat exchange reformer sources heat from: the fuel reactor, the gaseous combustion product from the fuel reactor, or the air reactor.

The process as described in the first aspect of the invention can be combined or supplemented with the process as claimed in any one the second, third and further aspect of the invention.

According to one embodiment of the invention, the heat exchanger reformer is in a separate process vessel from the fuel reactor.

According to one embodiment of the invention, the heat exchanger reformer comprises a plurality of vertically disposed catalyst tubes containing catalyst bed filling a portion of the catalyst tubes, the plurality of vertically disposed catalyst tubes of the heat exchange reformer are contained within freeboard of the fuel reactor but are maintained separate from a fluidized bed entrained with the oxidized metal oxide, said fluidized bed contained within the fuel reactor.

According to one embodiment of the invention, the heat exchanger reformer comprises a plurality of vertically disposed catalyst tubes containing catalyst bed filling a portion of the catalyst tubes, the plurality of vertically disposed catalyst tubes of the heat exchange reformer are contained within freeboard of the air reactor but are maintained separate from a fluidized bed entrained with the reduced metal oxide, said fluidized bed contained within the air reactor.

According to one embodiment of the invention, the heat exchanger reformer comprises a plurality of vertically disposed catalyst tubes containing catalyst bed filling a portion of the catalyst tubes, the plurality of vertically disposed catalyst tubes of the heat exchange reformer are in contact with both the gaseous combustion product exiting the fuel reactor in the freeboard and are also in contact with a fluidized bed entrained with the oxidized metal oxide, said fluidized bed contained within the fuel reactor.

According to one embodiment of the invention, the heat exchanger reformer comprises a plurality of vertically disposed catalyst tubes containing catalyst bed filling a portion of the catalyst tubes, the plurality of vertically disposed catalyst tubes of the heat exchange reformer are in contact with both gaseous combustion product exiting the air reactor in the freeboard and are also in contact with a fluidized bed entrained with the reduced metal oxide, said fluidized bed contained within the air reactor.

According to one embodiment of the invention, the heat exchanger reformer comprises a plurality of vertically disposed catalyst tubes containing catalyst bed filling a portion of the catalyst tubes, the plurality of vertically disposed catalyst tubes of the heat exchange reformer are contained within a fluidized bed entrained with the reduced metal oxide, said fluidized bed contained within the air reactor.

According to a further aspect of the invention, there is provided a process for a chemical looping combustion, comprising:

compressing ambient air in an air compressor to produce a compressed air;

feeding the compressed air into an air reactor;

reacting the compressed air with a reduced metal oxide contained within the air reactor to produce an oxidized metal oxide;

moving the oxidized metal oxide from the air reactor to a fuel reactor in communication with the air reactor;

mixing a fuel gas with a recycled flue gas to produce a mixture of the fuel gas with the recycled flue gas;

feeding the mixture of the fuel gas with the recycled flue gas to the fuel reactor to react with the oxidized metal oxide in the fuel reactor to produce a gaseous combustion product and the reduced metal oxide;

moving the reduced metal oxide from the fuel reactor to the air reactor;

feeding a portion of the gaseous combustion product to a recycle compressor to produce the recycled flue gas; and feeding a remaining portion of the gaseous combustion product to a condensing heat exchanger for water removal before scrubbing and cooling the remaining gas in a direct contact cooler.

According to another aspect of the invention, there is provided a process for a chemical looping combustion, comprising:

compressing ambient air in an air compressor to produce a compressed air;

feeding the compressed air into an air reactor;

reacting the compressed air with a reduced metal oxide contained within the air reactor to produce an oxidized metal oxide;

moving the oxidized metal oxide from the air reactor to a fuel reactor in communication with the air reactor;

mixing a fuel gas with a recycled flue gas to produce a mixture of the fuel gas with the recycled flue gas;

feeding the mixture of the fuel gas with the recycled flue gas to the fuel reactor to react with the oxidized metal oxide in the fuel reactor to produce a gaseous combustion product and the reduced metal oxide;

moving the reduced metal oxide from the fuel reactor to the air reactor;

feeding the gaseous combustion product to a condensing heat exchanger for water removal to produce a partially condensed gaseous combustion product;

feeding a portion of the partially condensed gaseous combustion product to a recycle compressor to produce the recycled flue gas; and feeding a remaining portion of the partially condensed gaseous combustion product for scrubbing and cooling in a direct contact cooler.

According to still another aspect of the invention, there is provided a process for a chemical looping combustion, comprising:

compressing ambient air in an air compressor to produce a compressed air;

feeding the compressed air into an air reactor;

reacting the compressed air with a reduced metal oxide contained within the air reactor to produce an oxidized metal oxide;

moving the oxidized metal oxide from the air reactor to a fuel reactor in communication with the air reactor;

mixing a fuel gas with a recycled flue gas to produce a mixture of the fuel gas with the recycled flue gas;

feeding the mixture of the fuel gas with the recycled flue gas to the fuel reactor to react with the oxidized metal oxide in the fuel reactor to produce a gaseous combustion product and the reduced metal oxide;

moving the reduced metal oxide from the fuel reactor to the air reactor;

feeding the gaseous combustion product to a condensing heat exchanger for water removal to produce a partially condensed gaseous combustion product;

feeding the partially condensed gaseous combustion product for scrubbing and cooling in a direct contact cooler to produce a purified $CO_2$ product; and feeding a portion of the $CO_2$ to the recycle compressor to produce the recycled flue gas.

Other features and advantages of the present invention will become apparent from the following detailed description and the accompanying drawings, which illustrate, by way of example, the principles of the invention.

BRIEF DESCRIPTION OF THE DRAWINGS

By way of example only, embodiments of the present invention are described hereinafter with reference to the accompanying drawings, wherein.

DETAILED DESCRIPTION OF THE INVENTION

Figure 1:
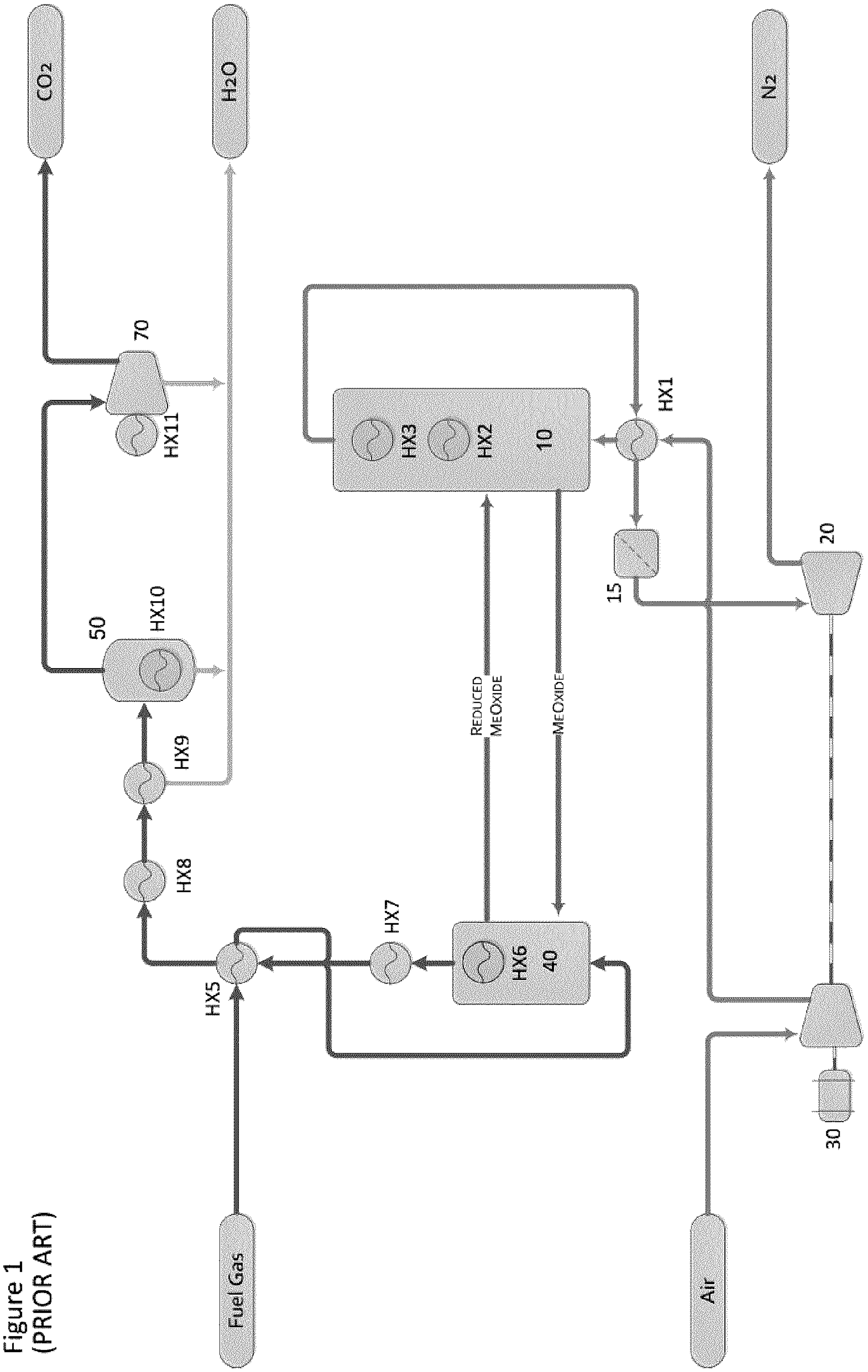
Figure 1 (PRIOR ART)
FIG. 1 is a schematic representation of an embodiment of a configuration of a known chemical looping combustion system (prior art)

It is to be understood that the disclosure is not limited in its application to the details of the embodiments as set forth in the following description. The invention is capable of other embodiments and of being practiced or of being carried out in various ways. By way of example only, preferred embodiments of the present invention are described hereinafter with reference to the accompanying drawings.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more".

In this disclosure, the fuel is considered to be composed of alkanes, but a person skilled in the art would understand that the present invention is also applicable for any hydrocarbon fuel that can be injected into the chemical looping combustion system in a gas phase.

According to the present invention:

(1) A heat exchange reformer is used to partially oxidize fuels in a chemical looping combustion system to increase the extent of fuel conversion or to reduce the relative increase or relative change in volumetric flow rate in fuel reactors in a chemical looping combustion system.

(2) Recycling of the flue gas of a chemical looping combustion system is used to decrease the relative change in volumetric flow rate in the fuel reactor.

Reforming of Fuel for Chemical Looping Combustion System in a Heat Exchange Reformer to Address Low Reactivity and/or Gas Expansion The process involves:

1. Reform at least a portion of the fuel used for a chemical looping combustion system in a heat exchange reformer through reaction with steam and/or other suitable gas containing components composed of oxides, or Reform at least a portion of the fuel used for a chemical looping combustion system in a heat exchange reformer through reaction with recycled flue gas. The recycled flue gas may be supplemented with steam and/or other suitable gas containing components composed of oxides.

2. Pass the reformed gas into the fuel reactor of a chemical looping combustion system in order to increase the extent of oxidation of the fuel/gas by reaction with an oxygen carrier.
3. Pass the oxygen carrier into an air reactor in which the oxygen carrier is oxidized by $O_2$ thereby releasing heat.
4. Pass the oxidized oxygen carrier to the fuel reactor transferring both oxygen and heat to the fuel reactor thereby providing both the heat and the oxygen required for oxidation of the fuel to proceed.
5. Pass the hot flue gas from fuel reactor to the heat exchange reformer to provide the heat for the endothermic reforming reactions via indirect heat exchange for some embodiments, heat could also come from the air reactor for the heat exchange reformer.

Figure 2A:
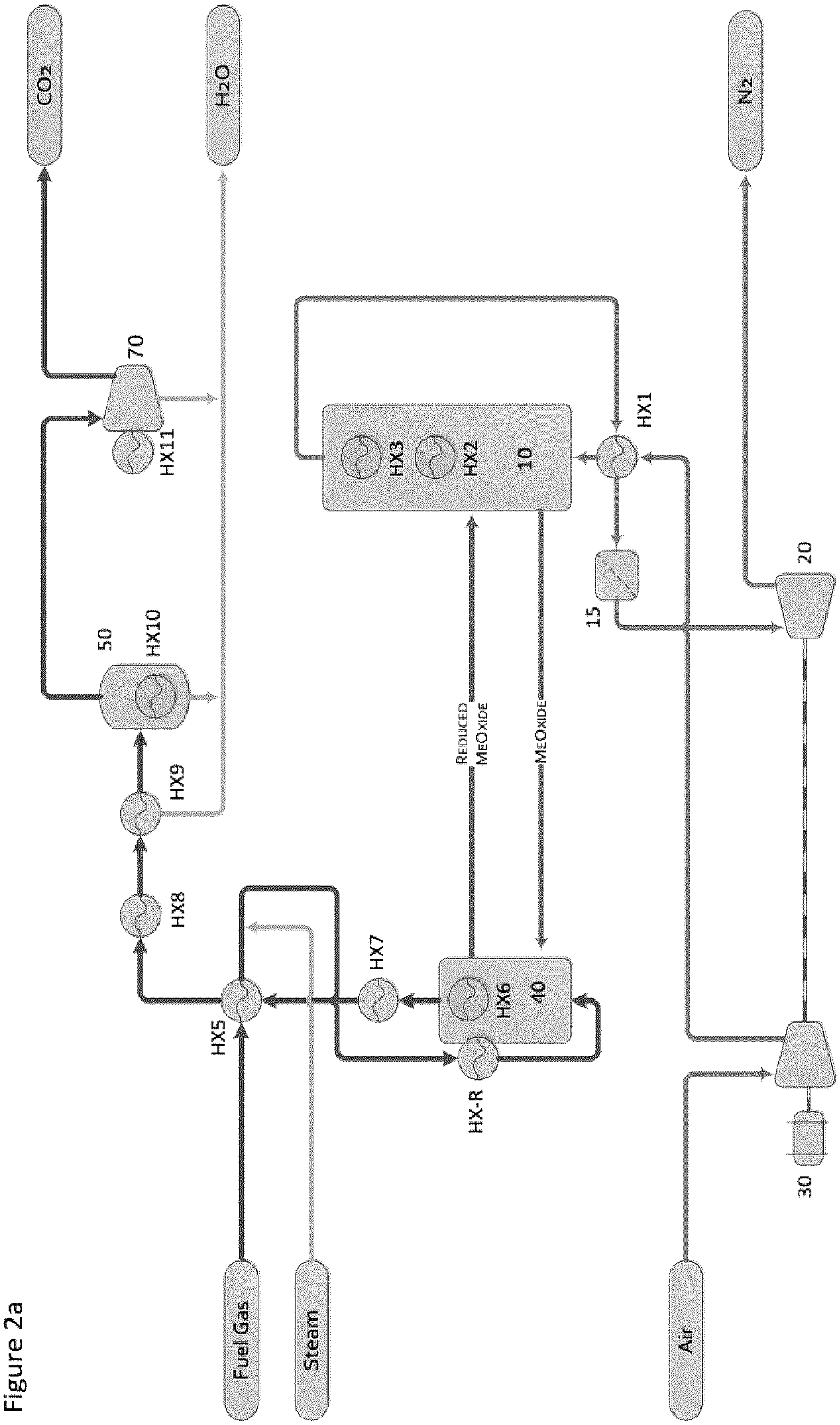
FIG. 2*a* is a schematic representation of an embodiment wherein gaseous fuel is mixed with steam and then sent to a heat exchanger reformer in a chemical looping combustion system according to the present invention.
Figure 2B:
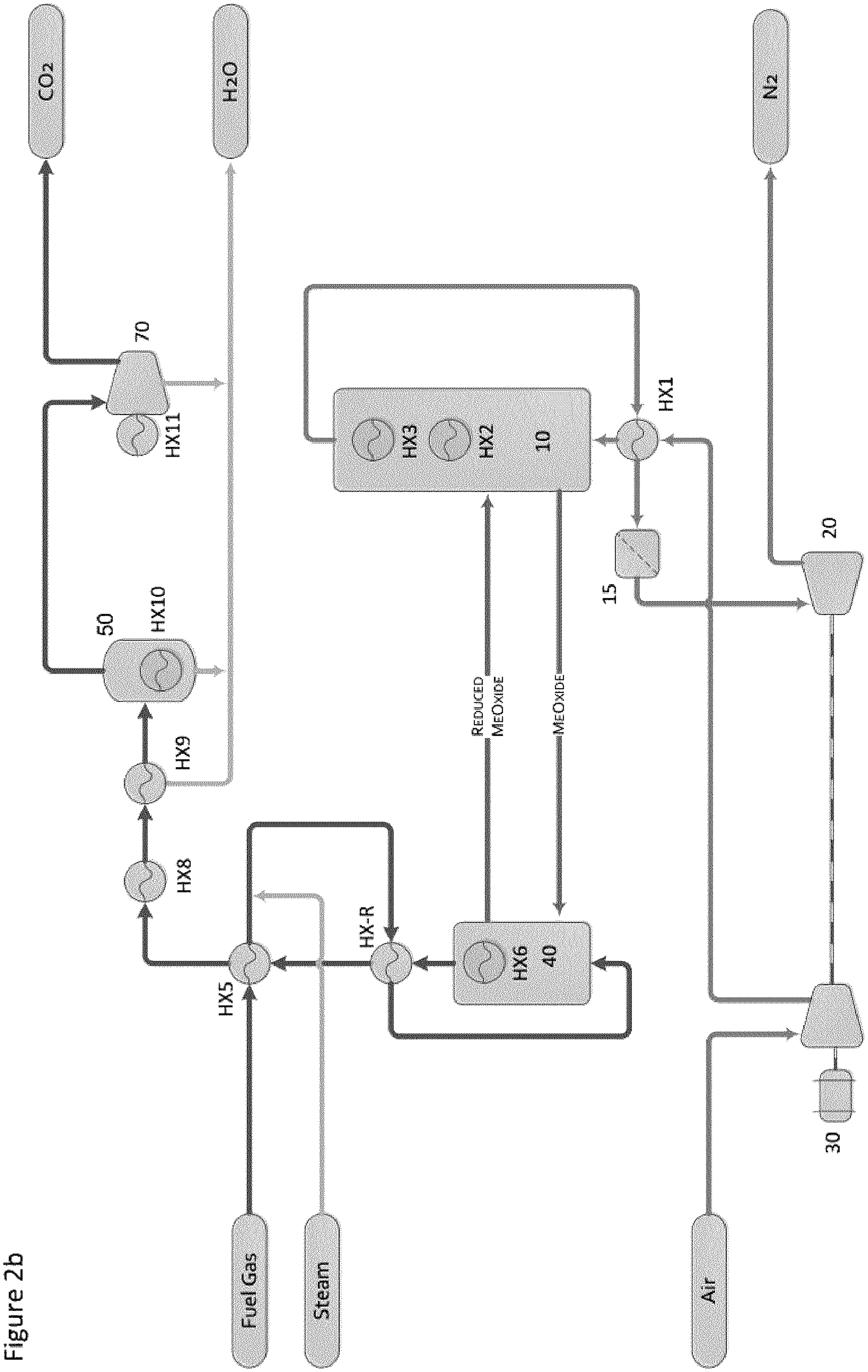
FIG. 2*b* is a schematic representation of another embodiment wherein gaseous fuel is mixed with steam and then sent to a heat exchanger reformer in a chemical looping combustion system according to the present invention.
Figure 2C:
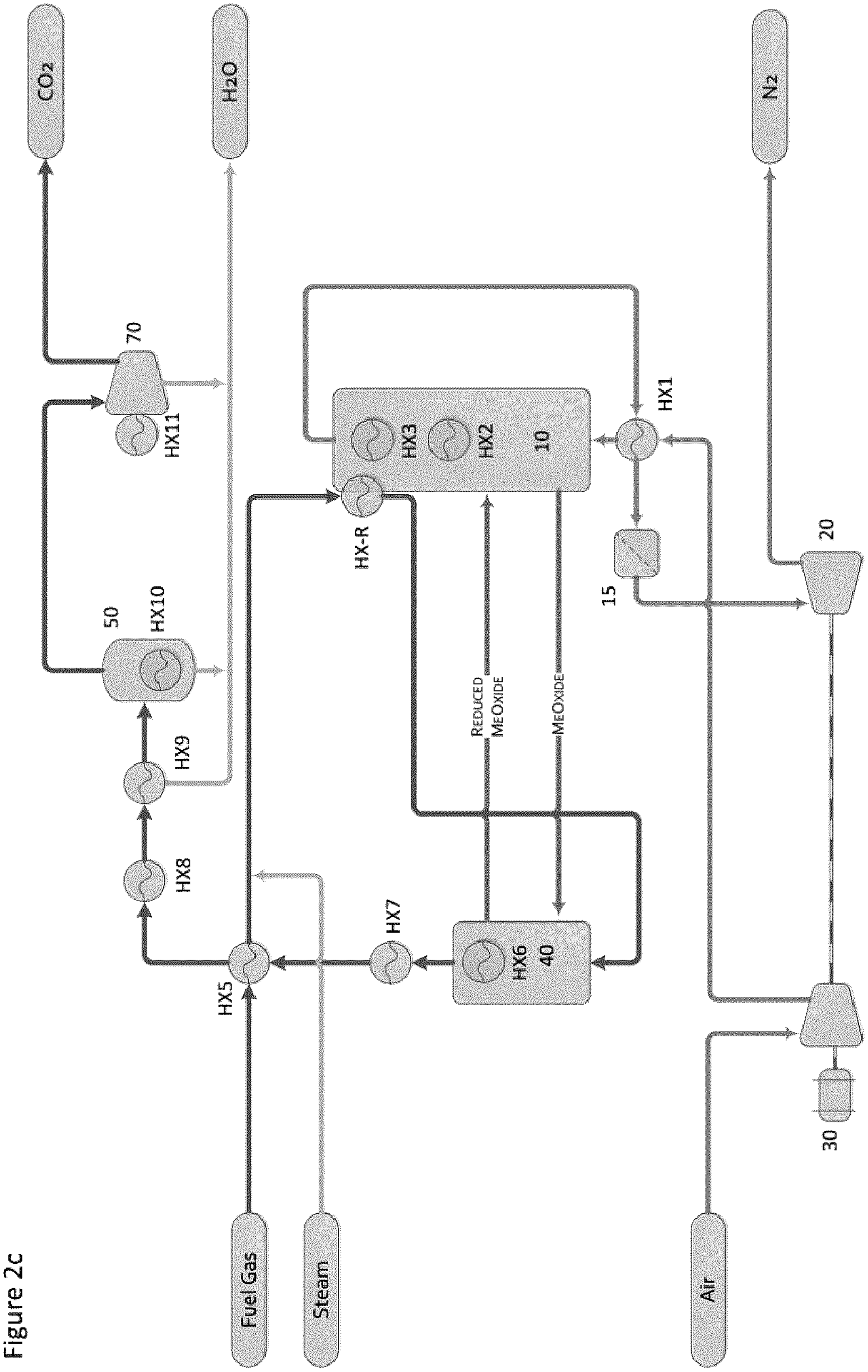
FIG. 2*c* is a schematic representation of a further embodiment wherein gaseous fuel is mixed with steam and then sent to a heat exchanger reformer in a chemical looping combustion system according to the present invention.

According to a first embodiment of the invention shown in FIGS. 2*a*, 2*b*, and 2*c*, steam is used as a reforming gas.

In a preferred embodiment, the water to be vaporized is sourced from flue gas condensate and most preferably from high temperature condensate.

Referring to FIGS. 2*a*, 2*b* and 2*c*, ambient air is compressed, pre-heated in a heat exchanger HX1 and then sent to an air reactor 10. In the air reactor 10, oxygen in the air reacts with a reduced metal oxide, producing an oxidized metal oxide and a vitiated air stream, composed primarily of nitrogen. Heat is removed from the air reactor 10 via an in-bed heat exchanger HX2 and a convective heat exchanger HX3. The vitiated air stream is cooled in heat exchanger HX1 and filtered through a vitiated air filter 15 before being expanded in a vitiated air expander 20 to produce power to run an air compressor 30. The vitiated air is then vented to atmosphere.

In contrast to the process shown in FIG. 1 where gaseous fuel (fuel gas) is pre-heated in a heat exchanger HX5 and enters a fuel reactor 40, in FIGS. 2*a*, 2*b* and 2*c*, gaseous fuel (fuel gas) is pre-heated in a heat exchanger HX5, and mixed with steam and then sent to a heat exchanger reformer HX-R.

The heat exchange reformer HX-R can source heat from, for example, fuel reactor 40 (FIG. 2*a*), the exhaust gas from the fuel reactor 40 (FIG. 2*b*) or the air reactor 10 (FIG. 2*c*). The product is reformed gas ($H_2$, CO, $CO_2$, $H_2O$), which is sent to the fuel reactor 40 which comprises a heat exchanger HX6 where it reacts with the oxidized metal oxide to produce gaseous combustion products ($H_2O$, $CO_2$) and reduced metal oxide.

The combustion products are subsequently cooled in a heat exchanger HX7 in FIGS. 2*a* and 2*c* or HX-R in FIG. 2*b*, heat exchangers HX5 and HX8. Water is then removed in a condensing heat exchanger HX9 before the gas is scrubbed and cooled further in a direct contact cooler 50 which comprises a heat exchanger HX10 to produce a purified $CO_2$ product. The $CO_2$ product is then further dried by a heat exchanger HX11 and compressed by a $CO_2$ compressor 70.

The position of the heat exchange reformer HX-R in FIGS. 2*a*, 2*b* and 2*c* differs from each other. The selection of the reformer HX-R position is based on optimizing the heat exchange network for the overall process, which is significantly impacted by the metal oxide selected for use in the fuel reactor 40 and the air reactor 10. The options presented herewith are the locations with high temperature heat required for the reformer.

According to a second embodiment of the invention (see FIGS. 3*a*, 3*b* and 3*c*), recycled flue gas is used as a reforming gas; it is recycled from a location in the flue gas processing train above the dew point of water in the flue gas.

Figure 3A:
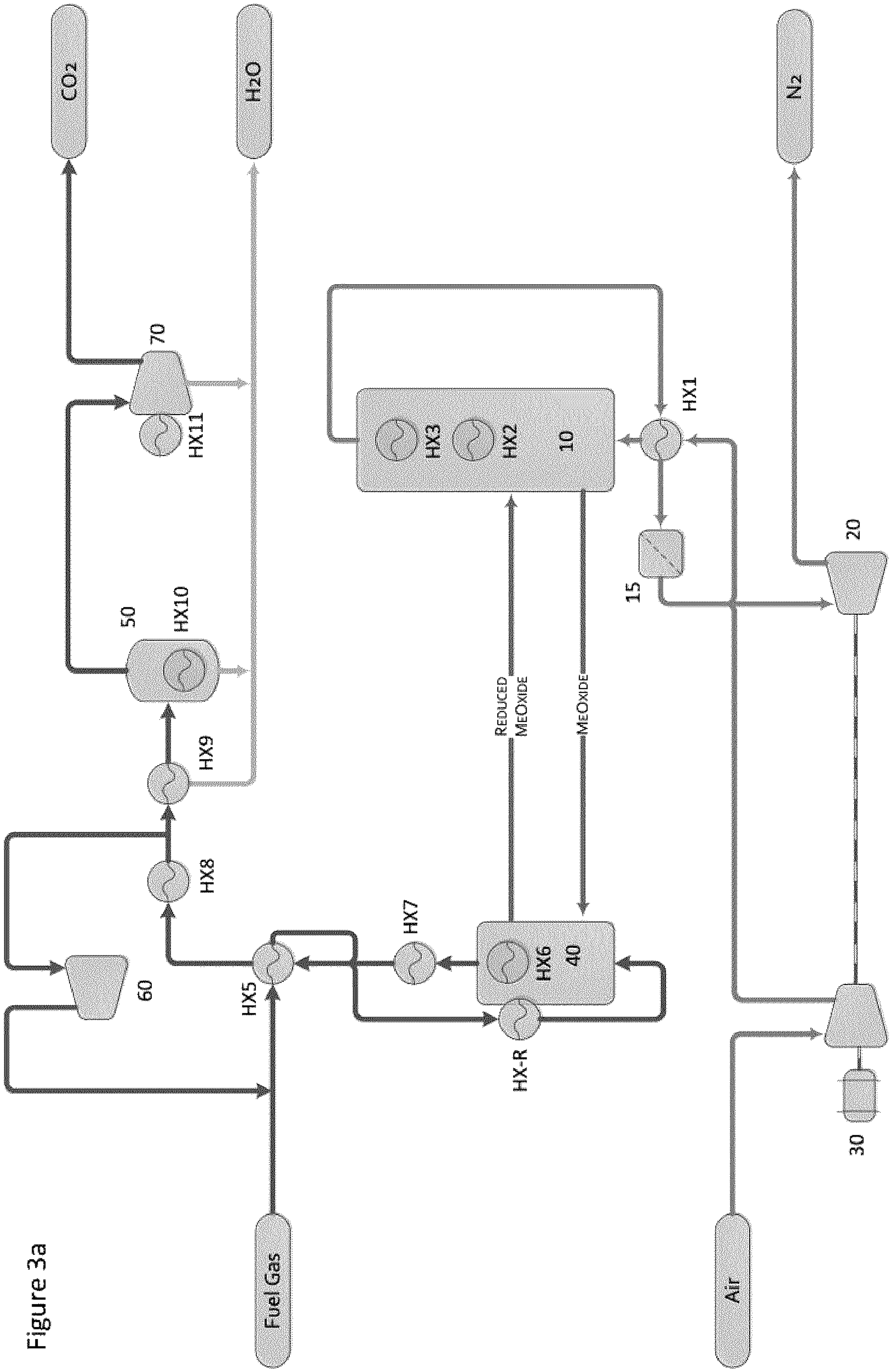
FIG. 3*a* is a schematic representation of an embodiment wherein gaseous fuel is mixed with recycled flue gas and then sent to a heat exchanger reformer in a chemical looping combustion system according to the present invention.
Figure 3B:
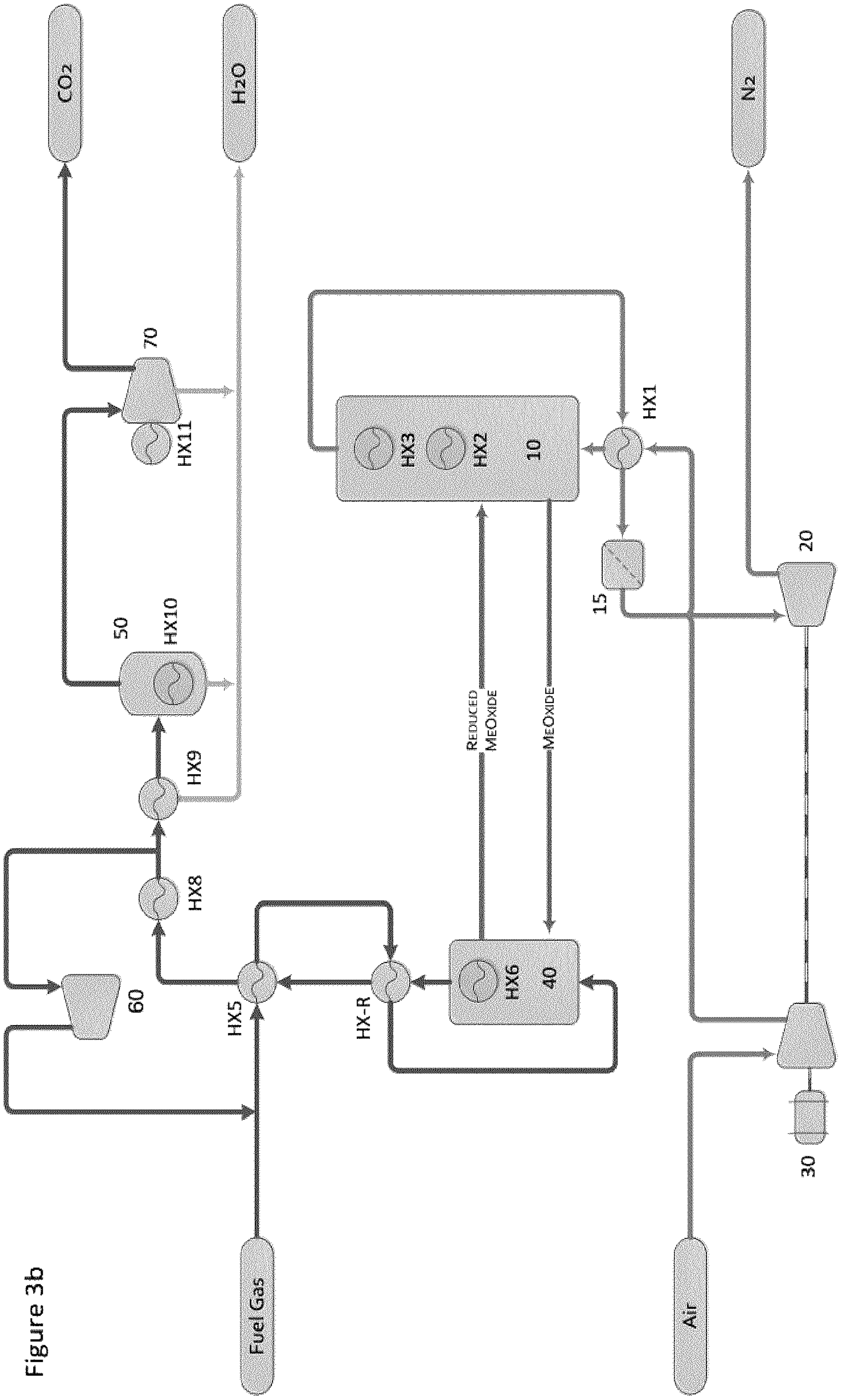
FIG. 3*b* is a schematic representation of another embodiment wherein gaseous fuel is mixed with recycled flue gas and then sent to a heat exchanger reformer in a chemical looping combustion system according to the present invention.
Figure 3C:
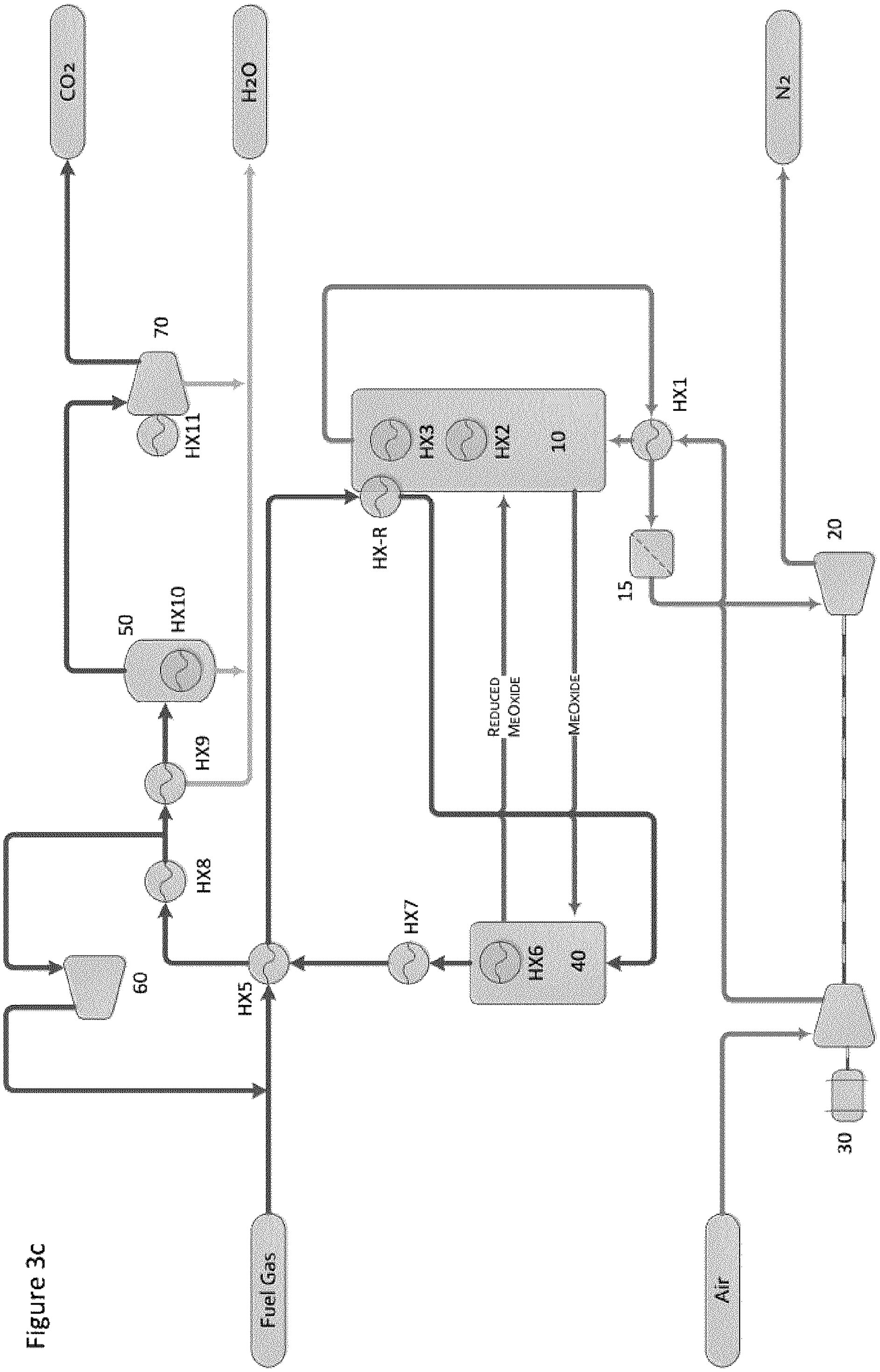
FIG. 3*c* is a schematic representation of a further embodiment wherein gaseous fuel is mixed with recycled flue gas and then sent to a heat exchanger reformer in a chemical looping combustion system according to the present invention.

Instead of using steam as shown in FIGS. 2*a*, 2*b* and 2*c*, recycled flue gas is used as a reforming gas as shown in FIGS. 3*a*, 3*b* and 3*c*.

Referring to FIGS. 3*a*, 3*b* and 3*c*, ambient air is compressed, pre-heated in a heat exchanger HX1 and then sent to an air reactor 10. In the air reactor 10, oxygen in the air reacts with a reduced metal oxide, producing an oxidized metal oxide and a vitiated air stream, composed primarily of nitrogen. Heat is removed from the air reactor 10 via an in-bed heat exchanger HX2 and a convective heat exchanger HX3. The vitiated air stream is cooled in heat exchanger HX1 and filtered through a vitiated air filter 15 before being expanded in a vitiated air expander 20 to produce power to run an air compressor 30. The vitiated air is then vented to atmosphere.

In contrast to the process shown in FIGS. 2*a*, 2*b* and 2*c*, where gaseous fuel (fuel gas) is pre-heated in a heat exchanger HX5, and then mixed with steam and then sent to a heat exchanger reformer HX-R, in FIGS. 3*a*, 3*b* and 3*c*, gaseous fuel is mixed with recycled flue gas ($H_2O$, $CO_2$), pre-heated in a heat exchanger HX5, and then sent to a heat exchanger reformer HX-R. The heat exchange reformer HX-R can source heat from fuel reactor 40 (FIG. 3*a*), the exhaust gas from the fuel reactor 40 (FIG. 3*b*) or the air reactor 10 (FIG. 3*c*). The product is reformed gas ($H_2$, CO, $CO_2$, $H_2O$), which is sent to the fuel reactor 40 which comprises a heat exchanger HX6 where it reacts with the oxidized metal oxide to produce gaseous combustion products ($H_2O$, $CO_2$) and reduced metal oxide. The combustion products are subsequently cooled in a heat exchanger HX7 in FIGS. 3*a* and 3*c* or HX-R in FIG. 3*b*, heat exchangers HX5 and HX8. A portion of the flue gas is then sent to a recycle compressor 60 to function as the reforming gas. The balance of the flue gas is sent to a condensing heat exchanger HX9 for bulk water removal before the gas is scrubbed and cooled further in a direct contact cooler 50 which comprises a heat exchanger HX10 to produce a purified $CO_2$ product. The $CO_2$ product is then further dried by a heat exchanger HX11 and compressed by a $CO_2$ compressor 70.

Similar to FIGS. 2*a*, 2*b* and 2*c*, the position of the heat exchange reformer HX-R in FIGS. 3*a*, 3*b* and 3*c* differs from each other. The selection of the reformer HX-R position is based on optimizing the heat exchange network for the overall process, which is significantly impacted by the metal oxide selected for use in the fuel reactor 40 and the air reactor 10. The options presented herewith are the locations with high temperature heat required for the heat exchange reformer HX-R.

According to a third embodiment of the invention, the recycled flue gas is used as a reforming gas. In contrast to the second embodiment shown in FIGS. 3*a*, 3*b* and 3*c*, the recycled flue gas in the third embodiment is recycled from a location at which the flue gas has been partially condensed in a scrubber or similar device that removes particulate matter from the flue gas. Adjusting the temperature of the scrubber allows the hydrogen to carbon ratio of the recycled flue gas to be easily adjusted in order to achieve a desirable reformed gas composition. See FIGS. 4*a*, 4*b*, and 4*c*.

Figure 4A:
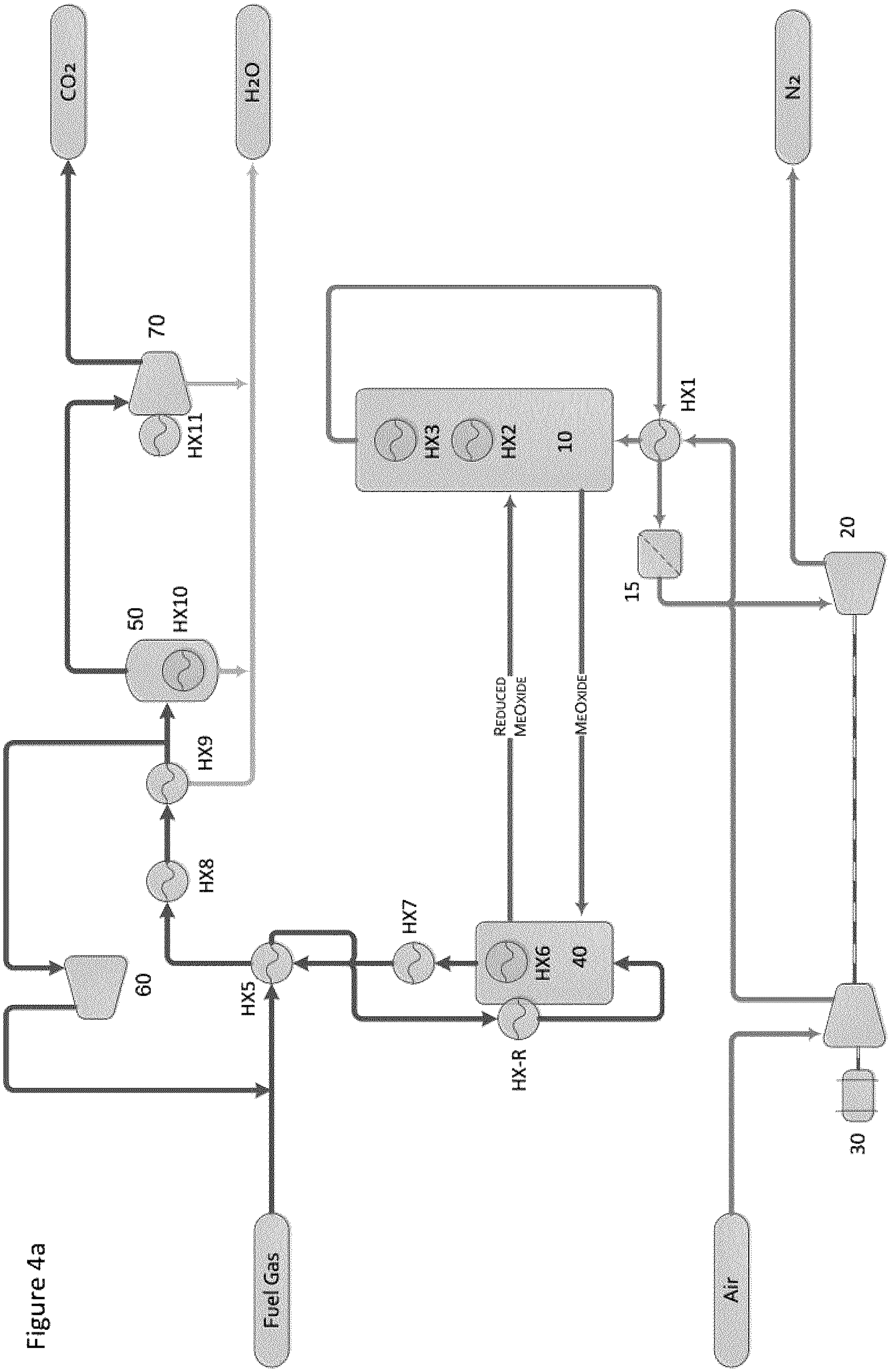
FIG. 4*a* is a schematic representation of an embodiment wherein gaseous fuel is mixed with recycled flue gas which has been partially condensed in a scrubber or similar device, drawn before a direct contact cooler and then sent to a heat exchanger reformer in a chemical looping combustion system according to the present invention.
Figure 4B:
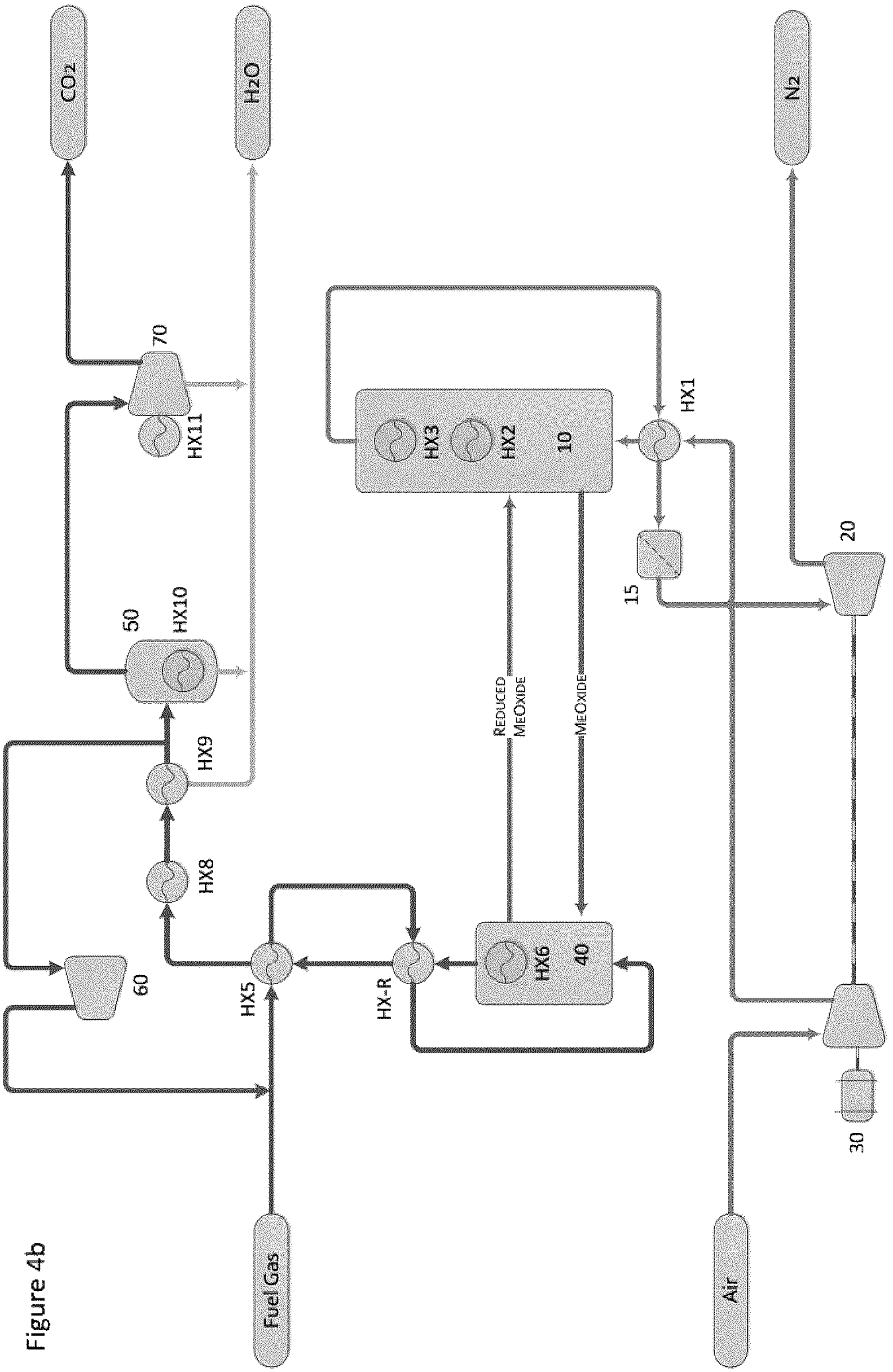
FIG. 4*b* is a schematic representation of another embodiment wherein gaseous fuel is mixed with recycled flue gas which has been partially condensed in a scrubber or similar device, drawn before a direct contact cooler and then sent to a heat exchanger reformer in a chemical looping combustion system according to the present invention.

In a preferred embodiment, the heat transferred to the heat exchange reformer HX-R is sourced from HX6 or HX7 (FIGS. 4*a* and 4*b*, respectively).

Figure 4C:
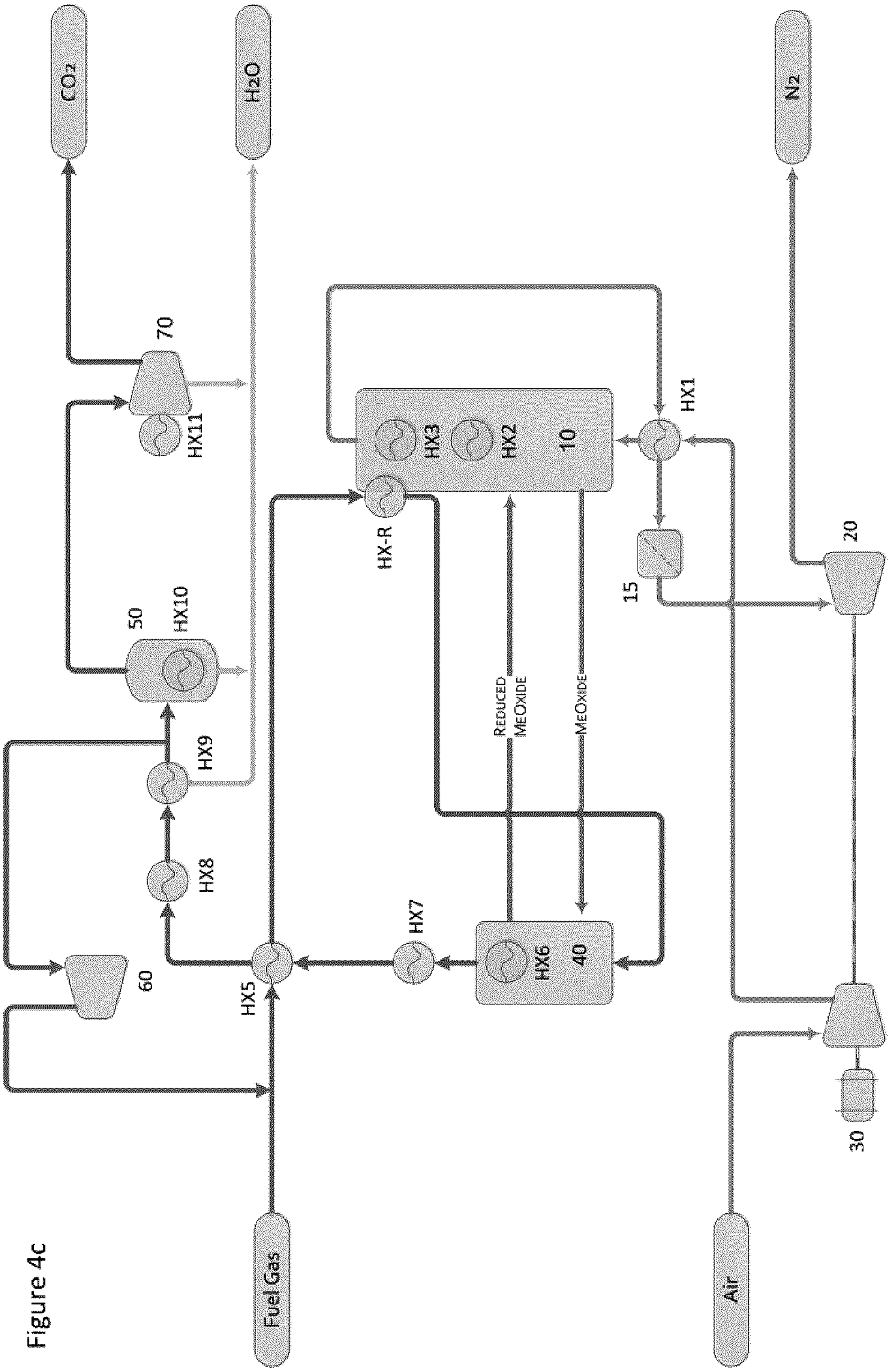
FIG. 4*c* is a schematic representation of a further embodiment wherein gaseous fuel is mixed with recycled flue gas which has been partially condensed in a scrubber or similar device, drawn before a direct contact cooler and then sent to a heat exchanger reformer in a chemical looping combustion system according to the present invention.

Referring to FIGS. 4*a*, 4*b* and 4*c*, ambient air is compressed, pre-heated in a heat exchanger HX1 and then sent to an air reactor 10. In the air reactor 10, oxygen in the air reacts with a reduced metal oxide, producing an oxidized metal oxide and a vitiated air stream, composed primarily of nitrogen. Heat is removed from the air reactor 10 via an in-bed heat exchanger HX2 and a convective heat exchanger HX3. The vitiated air stream is cooled in heat exchanger HX1 and filtered through a vitiated air filter 15 before being expanded in a vitiated air expander 20 to produce power to run an air compressor 30. The vitiated air is then vented to atmosphere.

In contrast to the process shown in FIGS. 3*a*, 3*b* and 3*c*, the recycled flue gas is recycled from a location at which the flue gas has been partially condensed in a scrubber or similar device that removes particulate matter from the flue gas.

In FIGS. 4*a*, 4*b* and 4*c*, gaseous fuel is mixed with recycled flue gas ($H_2O$, $CO_2$), pre-heated in a heat exchanger HX5, and then sent to a heat exchanger reformer HX-R. The heat exchange reformer HX-R can source heat from fuel reactor 40 (FIG. 4*a*), the exhaust gas from the fuel reactor 40 (FIG. 4*b*) or the air reactor 10 (FIG. 4*c*). The product is reformed gas ($H_2$, CO, $CO_2$, $H_2O$), which is sent to the fuel reactor 40 which comprises a heat exchanger HX6 where it reacts with the oxidized metal oxide to produce gaseous combustion products ($H_2O$, $CO_2$) and reduced metal oxide. The combustion products are subsequently cooled in a heat exchanger HX7 in FIGS. 4*a* and 4*c* or HX-R in FIG. 4*b*, heat exchangers HX5 and HX8. Water is then removed in a condensing heat exchanger HX9. A portion of the flue gas is sent to the recycle compressor 60 to function as the reforming gas. The balance of the flue gas is scrubbed and cooled further in a direct contact cooler 50 to produce a purified $CO_2$ product. The $CO_2$ product is then further dried by a heat exchanger HX11 and compressed by a $CO_2$ compressor 70.

Similar to FIGS. 2*a*, 2*b* and 2*c*, the position of the heat exchange reformer HX-R in FIGS. 4*a*, 4*b* and 4*c* differs from each other. The selection of the reformer HX-R position is based on optimizing the heat exchange network for the overall process, which is significantly impacted by the metal oxide selected for use in the fuel reactor 40 and the air reactor 10. The options presented herewith are the locations with high temperature heat required for the heat exchange reformer HX-R.

According to a fourth embodiment of the invention, recycled flue gas is used as a reforming gas. In contrast to third embodiment shown in FIGS. 4*a*, 4*b* and 4*c*, in FIGS. 5*a*, 5*b* and 5*c*, the recycled flue gas is recycled from a location where the flue gas has been cooled and is composed primarily of unreacted fuel components and carbon dioxide.

Figure 5A:
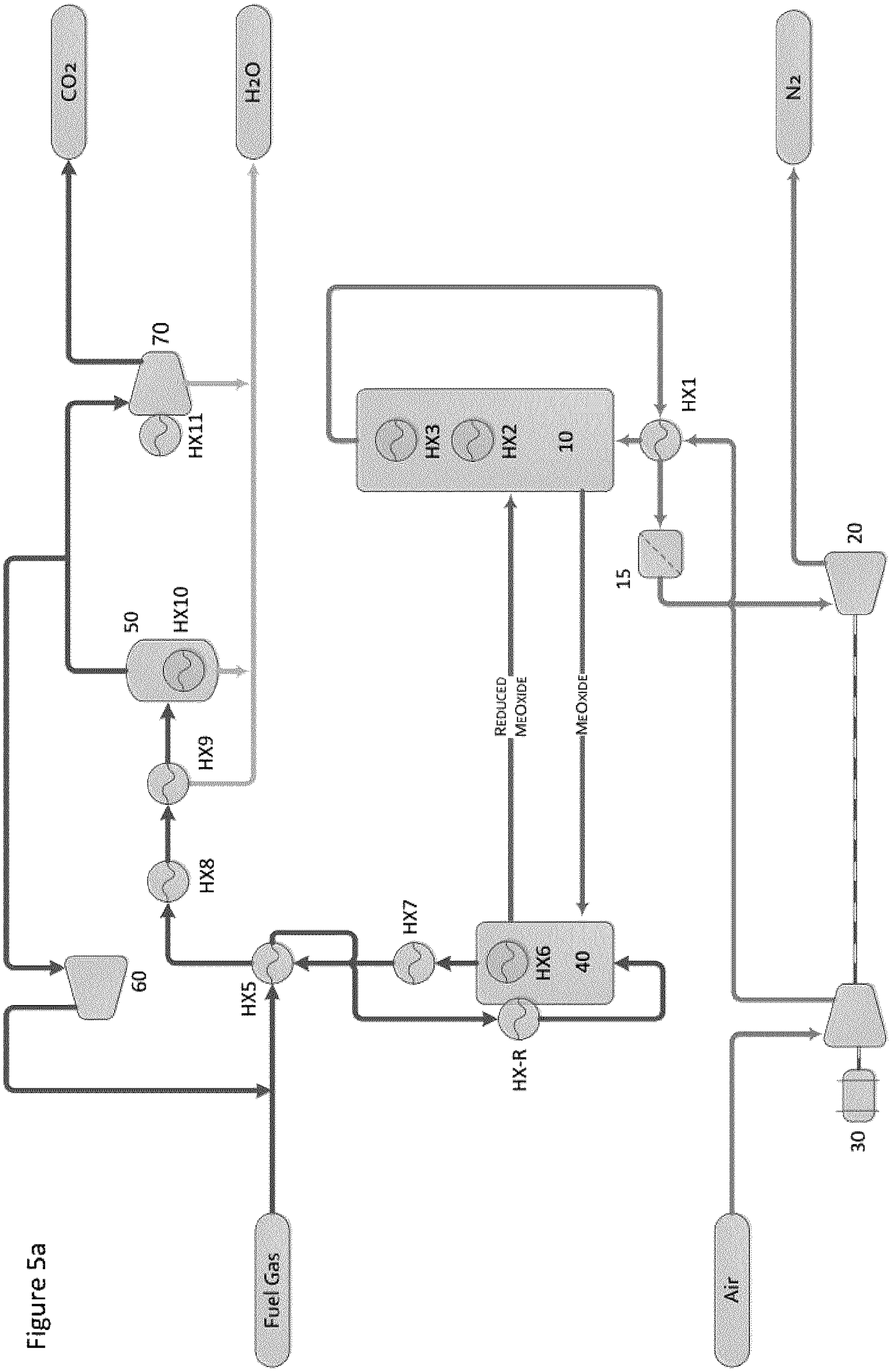
FIG. 5*a* is a schematic representation of an embodiment wherein gaseous fuel is mixed with recycled flue gas which has been drawn after a direct contact cooler and then sent to a heat exchanger reformer in a chemical looping combustion system according to the present invention.
Figure 5B:
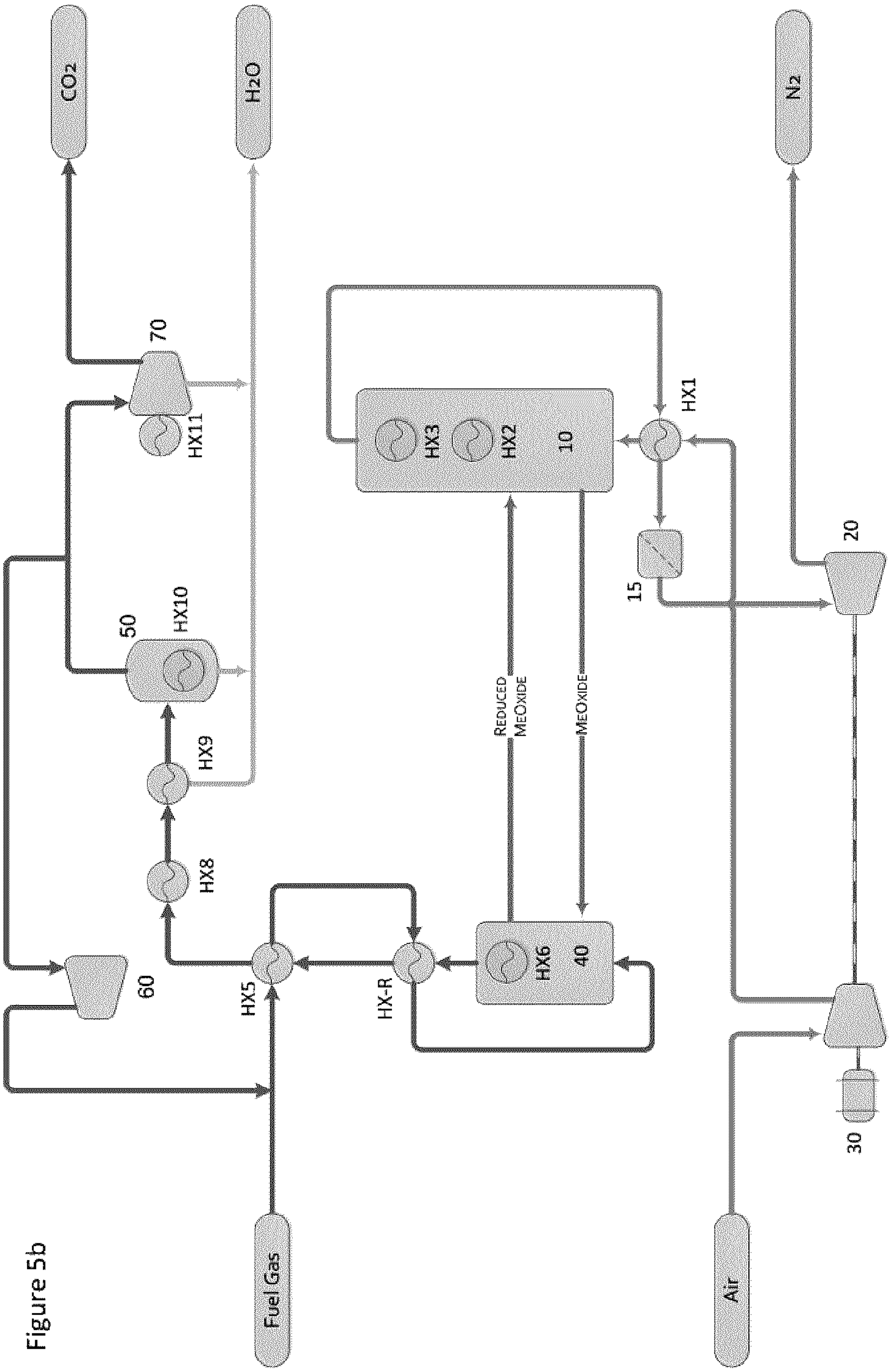
FIG. 5*b* is a schematic representation of another embodiment wherein gaseous fuel mixed with recycled flue gas which has been drawn after a direct contact cooler and then sent to a heat exchanger reformer in a chemical looping combustion system according to the present invention.
Figure 5C:
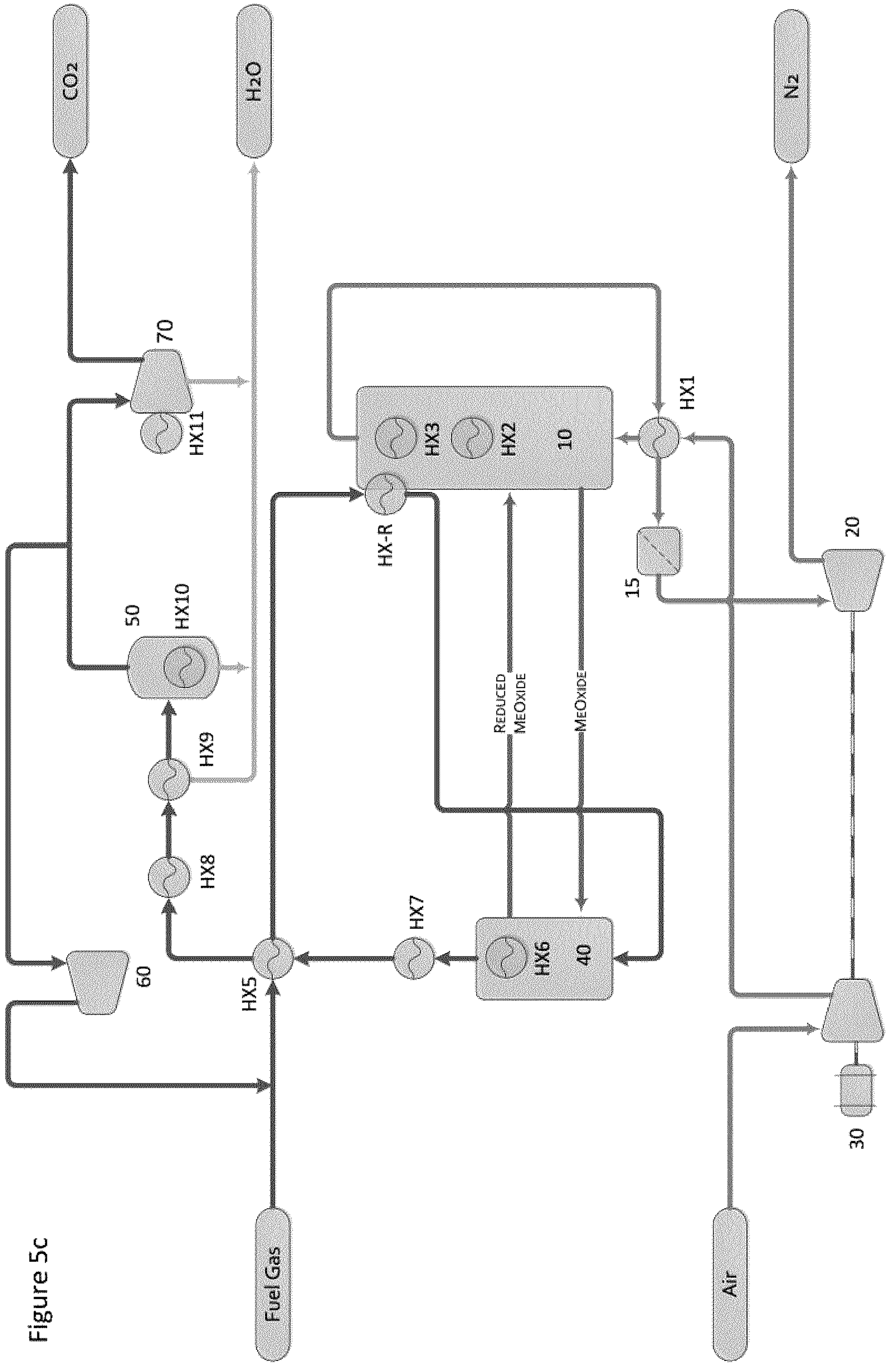
FIG. 5*c* is a schematic representation of a further embodiment wherein gaseous fuel mixed with recycled flue gas which has been drawn after a direct contact cooler and then sent to a heat exchanger reformer in a chemical looping combustion system according to the present invention.

Referring to FIGS. 5*a*, 5*b* and 5*c*, ambient air is compressed, pre-heated in a heat exchanger HX1 and then sent to an air reactor 10. In the air reactor 10, oxygen in the air reacts with a reduced metal oxide, producing an oxidized metal oxide and a vitiated air stream, composed primarily of nitrogen. Heat is removed from the air reactor 10 via an in-bed heat exchanger HX2 and a convective heat exchanger HX3. The vitiated air stream is cooled in heat exchanger HX1 and filtered through a vitiated air filter 15 before being expanded in a vitiated air expander 20 to produce power to run an air compressor 30. The vitiated air is then vented to atmosphere.

The difference between FIGS. 4*a*, 4*b* and 4*c* and FIGS. 5*a*, 5*b* and 5*c* is the location from which the recycled flue gas is taken. In FIGS. 4*a*, 4*b* and 4*c*, the recycled flue gas is drawn after HX9 and before the director contact cooler 50/HX10 whereas in FIGS. 5*a*, 5*b* and 5*c*, the recycle flue gas is drawn after the director contact cooler 50/HX10 but before the $CO_2$ compressor 70.

In FIGS. 5*a*, 5*b* and 5*c*, gaseous fuel is mixed with recycled flue gas ($H_2O$, $CO_2$), pre-heated in a heat exchanger HX5, and then sent to a heat exchanger reformer HX-R. The heat exchange reformer HX-R can source heat from fuel reactor 40 (FIG. 5*a*), the exhaust gas from the fuel reactor 40 (FIG. 5*b*) or the air reactor 10 (FIG. 5*c*). The product is reformed gas ($H_2$, CO, $CO_2$, $H_2O$), which is sent to the fuel reactor 40 which comprises a heat exchanger HX6 where it reacts with the oxidized metal oxide to produce gaseous combustion products ($H_2O$, $CO_2$) and reduced metal oxide. The combustion products are subsequently cooled in a heat exchanger HX7 in FIGS. 5*a* and 5*c* or HX-R in FIG. 5*b*, heat exchangers HX5 and HX8. Water is then removed in a condensing heat exchanger HX9 and is scrubbed and cooled further in a direct contact cooler 50 to produce a purified $CO_2$ product. A portion of the $CO_2$ is sent to the recycle compressor 60 to function as the reforming gas. The balance of the $CO_2$ product is then further dried by a heat exchanger HX11 and compressed by a $CO_2$ compressor 70.

Similar to FIGS. 2*a*, 2*b* and 2*c*, the position of the heat exchange reformer HX-R in FIGS. 4*a*, 4*b* and 4*c* differs from each other. The selection of the reformer HX-R position is based on optimizing the heat exchange network for the overall process, which is significantly impacted by the metal oxide selected for use in the fuel reactor 40 and the air reactor 10. The options presented herewith are the locations with high temperature heat required for the heat exchange reformer HX-R.

Regarding the second, third and fourth embodiments described above, the size of equipment, process efficiency and recycled flue gas condition (pressure, temperature, composition) are all impacted by where in the process the recycled flue gas is drawn from.

According to a fifth embodiment of the invention, any of the second, third and fourth embodiments described above where the recycled flue gas is used can be combined or supplemented with the first embodiment where steam and/or other suitable gases containing components composed of oxides.

Regarding the physical configurations of the heat exchange reformer HX-R as described above in the first, second, third, fourth and fifth embodiments, several different configurations can be applied.

Figure 6:
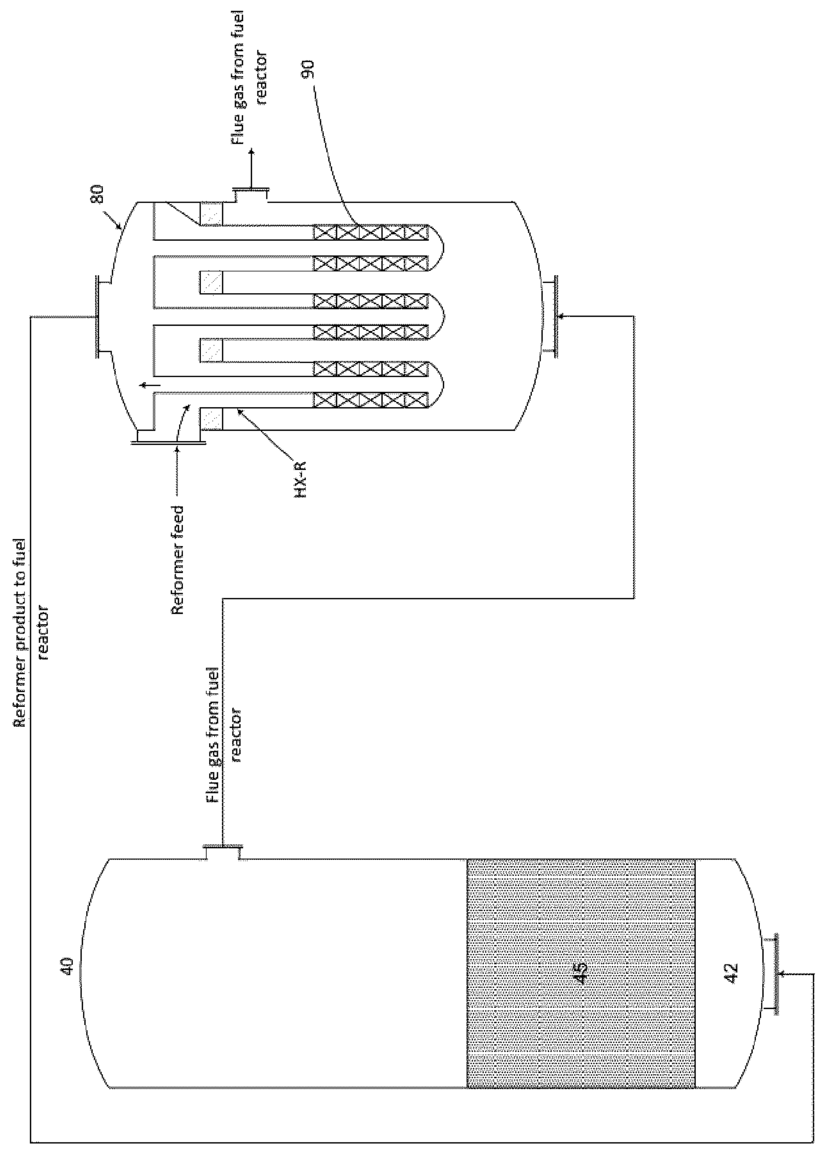
FIG. 6 is a schematic representation of an embodiment of the physical configuration of a heat exchange reformer according to the present invention.

According to the present invention, a first configuration of the heat exchange reformer HX-R is shown in FIG. 6.

Referring to FIG. 6, the fuel reactor 40 has a distributor 42 at the bottom of the fuel reactor 40. A fluidized bed 45 of entrained oxygen carrier bed material is configured within the fuel reactor 40. The heat exchange reformer HX-R is contained in a process vessel 80, said process vessel 80 is separated from the fuel reactor 40, as is currently practiced with heat exchange reformers associated with autothermal reforming and steam methane reforming. The heat exchange reformer HX-R comprises a plurality of vertically disposed catalyst tubes containing catalyst bed 90 which fill a portion of the catalyst tubes. The gas for heating the heat exchange reformer HX-R can come from the fuel reactor 40 or the air reactor 10 as described above (see for example FIGS. 2*b*, 3*b* and 4*b* for the configuration using gas from the fuel reactor).

Figure 7:
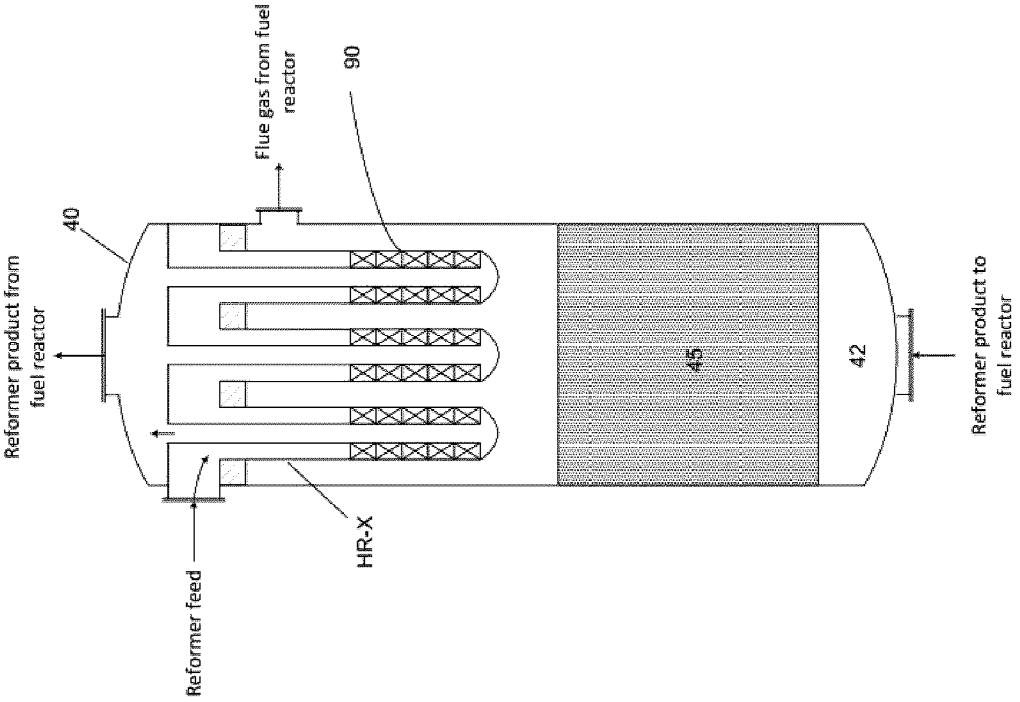
FIG. 7 is a schematic representation of another embodiment of the physical configuration of a heat exchange reformer according to the present invention.

According to the present invention, a second configuration of the heat exchange reformer HX-R is shown in FIG. 7.

Referring to FIG. 7, the plurality of vertically disposed catalyst tubes of the heat exchange reformer HX-R are contained within the freeboard of the fuel reactor 40 but are maintained separate from the fluidized bed 45. This configuration of the HX-R can be applied in the embodiments as shown in FIGS. 2*a*, 3*a* and 4*a*.

Similarly, in a third configuration of the heat exchange reformer HX-R, the plurality of vertically disposed catalyst tubes of the heat exchange reformer HX-R are located in the freeboard of the air reactor 10. This configuration of the HX-R can be applied in the embodiments shown in FIGS. 2*c*, 3*c* and 4*c*.

Figure 8:
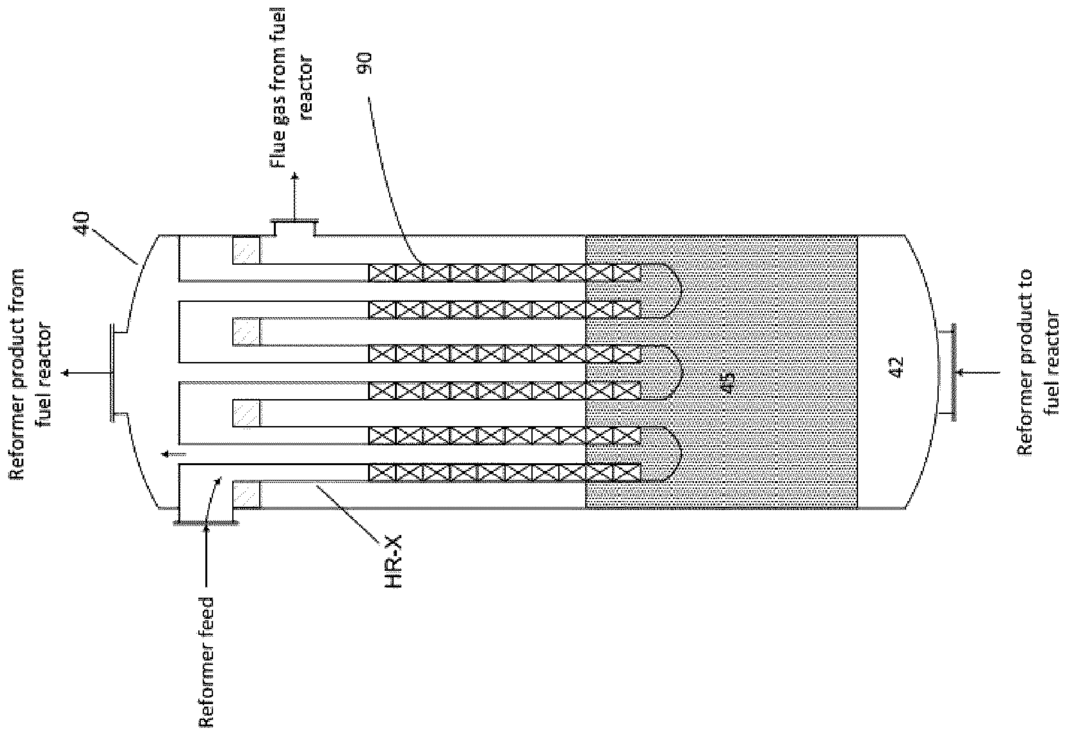
FIG. 8 is a schematic representation of a further embodiment of the physical configuration of a heat exchange reformer according to the present invention.

According to the present invention, a fourth configuration of the heat exchange reformer HX-R is shown in FIG. 8.

Referring to FIG. 8, the plurality of vertically disposed catalyst tubes of the heat exchange reformer HX-R are in contact with both the gases leaving the fuel reactor 40 in the freeboard and also with the oxygen carrier bed material entrained in the fluidized bed 45 in the fuel reactor 40. This configuration of the HX-R can be applied in the embodiments shown in FIGS. 2*a*, 3*a* and 4*a*.

Similarly, in a fifth configuration of the heat exchange reformer HX-R, the plurality of vertically disposed catalyst tubes of the heat exchange reformer HX-R are in contact with both the gases leaving the air reactor 10 in the freeboard and also with the oxygen carrier bed material entrained in the fluidized bed 105 in the fuel reactor 10. This configuration of the HX-R can be applied in the embodiments shown in FIGS. 2*c*, 3*c* and 4*c*.

Figure 9:
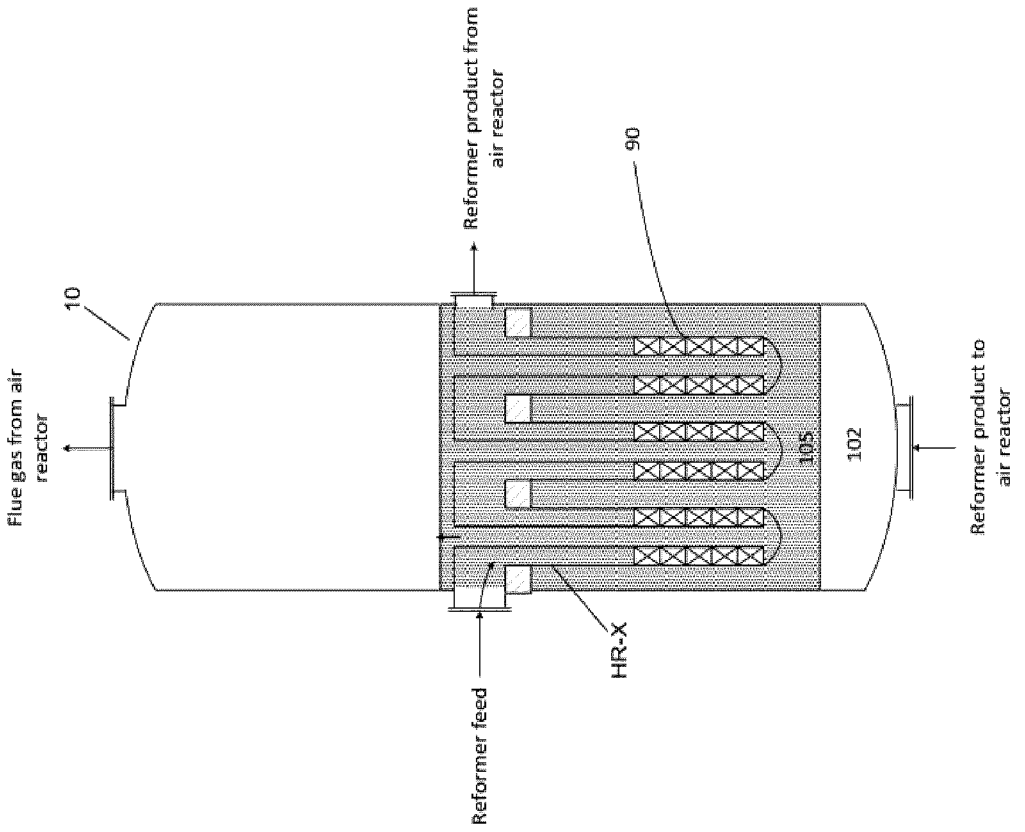
FIG. 9 is a schematic representation of an additional embodiment of the physical configuration of a heat exchange reformer according to the present invention.

According to the present invention, a sixth configuration of the heat exchange reformer HX-R is shown in FIG. 9.

Referring to FIG. 9, an air reactor 10 with a distributor 102 at the bottom of the air reactor 10 and a fluidized bed 105 entrained with oxygen carrier bed material configured within the air reactor 10 is shown. The plurality of vertically disposed catalyst tubes of the heat exchange reformer HX-R are located in fluidized bed 105 of the air reactor 10. This configuration of the HX-R can be applied in the embodiments shown in FIGS. 2*c*, 3*c* and 4*c*.

Recycle of Flue Gas

Instead of using a heat exchange reformer as described above to address the issue of low reactivity and/or gas expansion, the process involves:

1. Recycle a portion of the flue gas from the flue gas treatment system of a chemical looping combustion system back to the gas inlet of the fuel reactor with the fuel feed in order to achieve the desired volumetric gas expansion and to achieve a desired ratio of superficial velocity divided by minimum fluidization velocity.
2. Oxidize the fuel and recycled flue gas mixture through reaction with oxidized oxygen carrier thereby reducing the oxygen carrier.
3. Pass the reduced oxygen carrier into an air reactor in which the oxygen carrier is oxidized by $O_2$ thereby releasing heat.
4. Pass the oxidized oxygen carrier to the fuel reactor transferring both oxygen and heat to the fuel reactor thereby providing the oxygen required for oxidation of the fuel to proceed.

The source of recycled flue gas contains unreacted fuel, carbon dioxide, and/or water.

In the first to fifth embodiments described above, a heat exchanger reformer HX-R is used. In the following embodiments (sixth to eighth), no heat exchanger reformer HX-R is used.

According to a sixth embodiment of the present invention, the recycled flue gas is recycled from a location in the flue gas processing train above the dew point of water in the flue gas.

Figure 10:
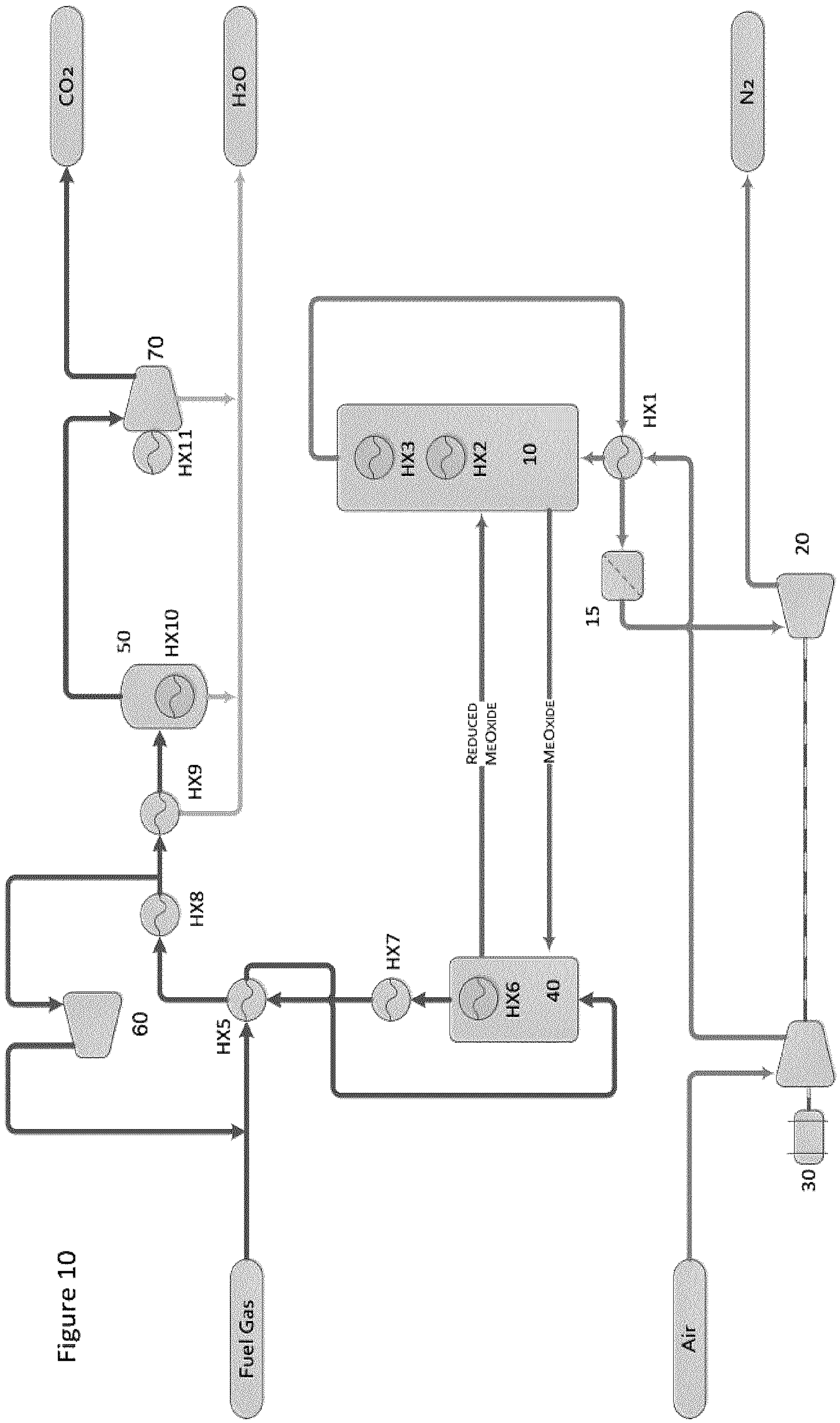
FIG. 10 is a schematic representation of an embodiment wherein gaseous fuel is mixed with recycled flue gas in a chemical looping combustion system according to the present invention.

Referring to FIG. 10, ambient air is compressed, pre-heated in a heat exchanger HX1 and then sent to an air reactor 10. In the air reactor 10, oxygen in the air reacts with a reduced metal oxide, producing an oxidized metal oxide and a vitiated air stream, composed primarily of nitrogen. Heat is removed from the air reactor 10 via an in-bed heat exchanger HX2 and a convective heat exchanger HX3. The vitiated air stream is cooled in heat exchanger HX1 and filtered through a vitiated air filter 15 before being expanded in a vitiated air expander 20 to produce power to run an air compressor 30. The vitiated air is then vented to atmosphere.

In contrast to the process shown in FIG. 3*a*, where gaseous fuel (fuel gas) is mixed with recycled flue gas ($H_2O$, $CO_2$), pre-heated in a heat exchanger HX5 and then sent to a heat exchanger reformer HX-R, in FIG. 10, no heat exchanger reformer is used. In FIG. 10, gaseous fuel is mixed with recycled flue gas ($H_2O$, $CO_2$), pre-heated in a heat exchanger HX5, and then sent to the fuel reactor 40 which comprises a heat exchanger HX6 where it reacts with the oxidized metal oxide to produce gaseous combustion products ($H_2O$, $CO_2$) and reduced the metal oxide. The combustion products are cooled in a heat exchanger HX7, heat exchangers HX5 and HX8. A portion of the flue gas is sent then to a recycle compressor 60. The balance of the flue gas is sent to a condensing heat exchanger HX9 for bulk water removal before the gas is scrubbed and cooled further in a direct contact cooler 50 to produce a purified $CO_2$ product. The $CO_2$ product is then further dried by a heat exchanger HX11 and compressed by a $CO_2$ compressor 70.

According to a seventh embodiment of the invention, the recycled flue gas is recycled from a location at which the flue gas has been partially condensed in a scrubber or similar device that removes particulate matter from the flue gas. Adjusting the temperature of the scrubber allows the hydrogen to carbon ratio of the recycled flue gas to be easily adjusted in order to achieve a desirable mixed inlet fuel gas composition.

Figure 11:
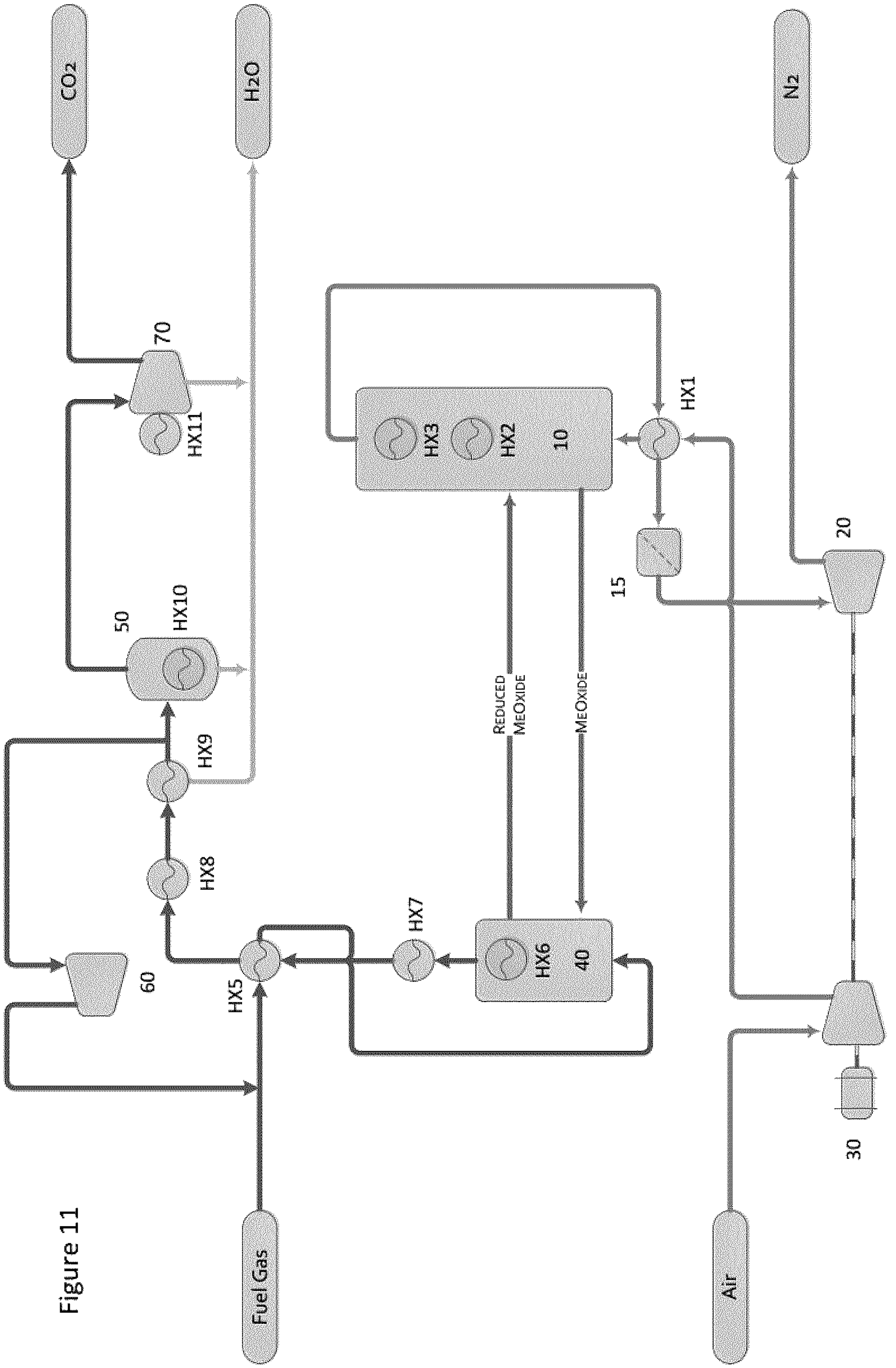
FIG. 11 is a schematic representation of an embodiment wherein gaseous fuel is mixed with recycled flue gas which has been partially condensed in a scrubber or similar device, drawn before a direct contact cooler in a chemical looping combustion system according to the present invention.

Referring to FIG. 11, ambient air is compressed, pre-heated in a heat exchanger HX1 and then sent to an air reactor 10. In the air reactor 10, oxygen in the air reacts with a reduced metal oxide, producing an oxidized metal oxide and a vitiated air stream, composed primarily of nitrogen. Heat is removed from the air reactor 10 via an in-bed heat exchanger HX2 and a convective heat exchanger HX3. The vitiated air stream is cooled in heat exchanger HX1 and filtered through a vitiated air filter 15 before being expanded in a vitiated air expander 20 to produce power to run an air compressor 30. The vitiated air is then vented to atmosphere.

In contrast to the process shown in FIG. 4*a*, where gaseous fuel is mixed with recycled flue gas ($H_2O$, $CO_2$), pre-heated in a heat exchanger HX5, and then sent to a heat exchanger reformer HX-R, in FIG. 11, no heat exchanger reformer is used. In FIG. 11, gaseous fuel is mixed with recycled flue gas ($H_2O$, $CO_2$), pre-heated in a heat exchanger HX5, and then sent to the fuel reactor 40 which comprises a heat exchanger HX6 where it reacts with the oxidized metal oxide to produce gaseous combustion products ($H_2O$, $CO_2$) and reduced the metal oxide. The combustion products are cooled in a heat exchanger HX7, heat exchangers HX5 and HX8. Water is then removed in a condensing heat exchanger HX9. A portion of the flue gas is sent to the recycle compressor 60. The balance of the flue gas is scrubbed and cooled further in a direct contact cooler 50 to produce a purified $CO_2$ product. The $CO_2$ product is then further dried by a heat exchanger HX11 and compressed by a $CO_2$ compressor 70.

According to an eighth embodiment of the invention, the recycled flue gas is recycled from a location where the flue gas has been cooled and is composed primarily of unreacted fuel components and carbon dioxide.

Figure 12:
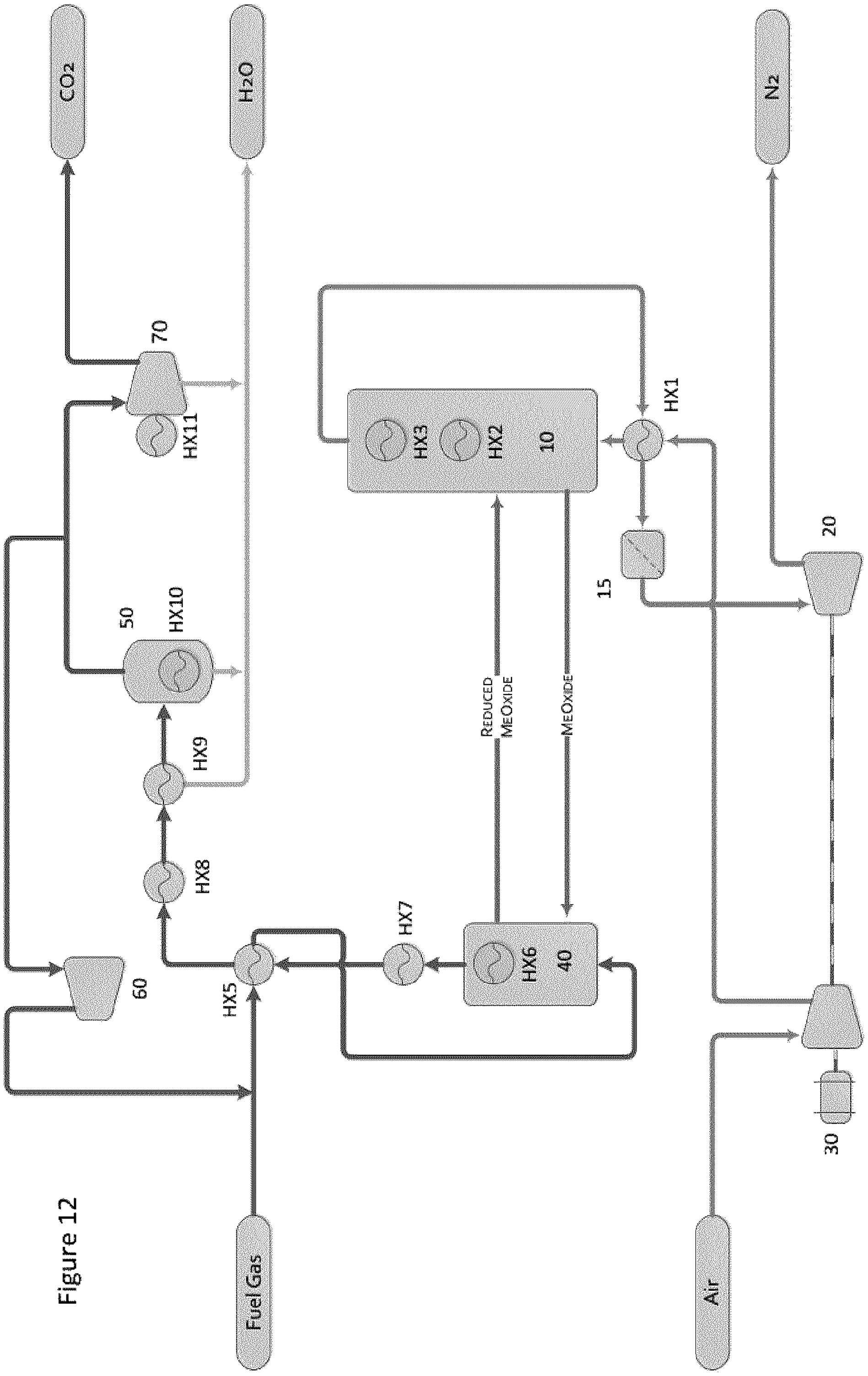
FIG. 12 is a schematic representation of an embodiment wherein gaseous fuel is mixed with recycled flue gas which has been drawn after a direct contact cooler in a chemical looping combustion system according to the present invention.

Referring to FIG. 12, ambient air is compressed, preheated in a heat exchanger HX1 and then sent to an air reactor 10. In the air reactor 10, oxygen in the air reacts with a reduced metal oxide, producing an oxidized metal oxide and a vitiated air stream, composed primarily of nitrogen. Heat is removed from the air reactor 10 via an in-bed heat exchanger HX2 and a convective heat exchanger HX3. The vitiated air stream is cooled in heat exchanger HX1 and filtered through a vitiated air filter 15 before being expanded in a vitiated air expander 20 to produce power to run an air compressor 30. The vitiated air is then vented to atmosphere.

In contrast to the process as shown in FIG. 5*a*, where gaseous fuel is mixed with recycled flue gas ($H_2O$, $CO_2$), pre-heated in a heat exchanger HX5, and then sent to a heat exchanger reformer HX-R, in FIG. 12, no heat exchanger reformer is used. In FIG. 12, gaseous fuel is mixed with recycled flue gas ($H_2O$, $CO_2$), pre-heated in a heat exchanger HX5, and then sent to the fuel reactor 40 which comprises a heat exchanger HX6 where it reacts with the oxidized metal oxide to produce gaseous combustion products ($H_2O$, $CO_2$) and reduced the metal oxide. The combustion products are cooled in a heat exchanger HX7, heat exchangers HX5 and HX8. Water is then removed in a condensing heat exchanger HX9 and is scrubbed and cooled further in a direct contact cooler 50 to produce a purified $CO_2$ product. A portion of the $CO_2$ is sent to the recycle compressor 60. The balance of the $CO_2$ product is then further dried by a heat exchanger HX11 and compressed by a $CO_2$ compressor 70.

Although the present invention has been described in considerable detail with reference to certain preferred embodiments thereof, other embodiments and modifications are possible. Therefore, the scope of the appended claims should not be limited by the preferred embodiments set forth in the examples but should be given the broadest interpretation consistent with the description as a whole.

The invention claimed is:

1. A process for a chemical looping combustion, comprising:

compressing ambient air in an air compressor to produce a compressed air;

feeding the compressed air into an air reactor;

reacting the compressed air with a reduced metal oxide contained within the air reactor to produce an oxidized metal oxide;

moving the oxidized metal oxide from the air reactor to a fuel reactor in communication with the air reactor;

mixing a fuel gas with a recycled flue gas to produce a mixture of the fuel gas with the recycled flue gas;

feeding the mixture of the fuel gas with the recycled flue gas to a heat exchanger reformer to produce a reformed gas;

feeding the reformed gas to the fuel reactor to react with the oxidized metal oxide in the fuel reactor to produce a gaseous combustion product and the reduced metal oxide;

moving the reduced metal oxide from the fuel reactor to the air reactor;

feeding the gaseous combustion product to a condensing heat exchanger for water removal to produce a partially condensed gaseous combustion product;

feeding the partially condensed gaseous combustion product for scrubbing and cooling in a direct contact cooler to produce a purified $CO_2$ product; and feeding a portion of the $CO_2$ to the recycle compressor to produce the recycled flue gas.

2. The process as claimed in claim 1, wherein the gaseous combustion product exiting the fuel reactor is cooled in a first heat exchanger or in the heat exchanger reformer before being fed to the condensing heat exchanger.

3. The process as claimed in claim 1, further comprising pre-heating the compressed air in a second heat exchanger and feeding the preheated compressed air into an air reactor connected to the second heat exchanger.

4. The process as claimed in claim 1, further comprising preheating a fuel gas in a third heat exchanger to produce a preheated fuel gas.

5. The process as claimed in claim 1, wherein the heat exchange reformer sources heat from: the fuel reactor, the gaseous combustion product from the fuel reactor, or the air reactor.

6. The process as claimed in claim 1, wherein steam is injected and mixed with the fuel gas and recycled flue gas upstream of the heat exchange reformer.

7. The process as claimed in claim 1, wherein the heat exchanger reformer is in a separate process vessel from the fuel reactor.

8. The process as claimed in claim 1, wherein the heat exchanger reformer comprises a plurality of vertically disposed catalyst tubes containing catalyst bed filling a portion of the catalyst tubes, the plurality of vertically disposed catalyst tubes of the heat exchange reformer are contained within freeboard of the fuel reactor but are maintained separate from a fluidized bed entrained with the oxidized metal oxide, said fluidized bed contained within the fuel reactor.

9. The process as claimed in claim 1, wherein the heat exchanger reformer comprises a plurality of vertically disposed catalyst tubes containing catalyst bed filling a portion of the catalyst tubes, the plurality of vertically disposed catalyst tubes of the heat exchange reformer are contained within freeboard of the air reactor but are maintained separate from a fluidized bed entrained with the reduced metal oxide, said fluidized bed contained within the air reactor.

10. The process as claimed in claim 1, wherein the heat exchanger reformer comprises a plurality of vertically disposed catalyst tubes containing catalyst bed filling a portion of the catalyst tubes, the plurality of vertically disposed catalyst tubes of the heat exchange reformer are in contact with both the gaseous combustion product exiting the fuel reactor in the freeboard and are also in contact with a fluidized bed entrained with the oxidized metal oxide, said fluidized bed contained within the fuel reactor.

11. The process as claimed in claim 1, wherein the heat exchanger reformer comprises a plurality of vertically disposed catalyst tubes containing catalyst bed filling a portion of the catalyst tubes, the plurality of vertically disposed catalyst tubes of the heat exchange reformer are in contact with both gaseous combustion product exiting the air reactor in the freeboard and are also in contact with a fluidized bed entrained with the reduced metal oxide, said fluidized bed contained within the air reactor.

12. The process as claimed in claim 1, wherein the heat exchanger reformer comprises a plurality of vertically disposed catalyst tubes containing catalyst bed filling a portion of the catalyst tubes, the plurality of vertically disposed catalyst tubes of the heat exchange reformer are contained within a fluidized bed entrained with the reduced metal oxide, said fluidized bed contained within the air reactor.

* * * * *